(12) United States Patent
Valleriano et al.

(10) Patent No.: US 7,327,383 B2
(45) Date of Patent: Feb. 5, 2008

(54) CORRELATING CAPTURED IMAGES AND TIMED 3D EVENT DATA

(75) Inventors: Michael A. Valleriano, Webster, NY (US); Christopher I. Marshall, Pittsford, NY (US); Mark A. Bobb, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 995 days.

(21) Appl. No.: 10/700,905

(22) Filed: Nov. 4, 2003

(65) Prior Publication Data

US 2005/0093976 A1 May 5, 2005

(51) Int. Cl.
*H04N 7/18* (2006.01)
*H04N 9/47* (2006.01)

(52) U.S. Cl. ................................... 348/143
(58) Field of Classification Search ............... None
See application file for complete search history.

(56) References Cited

U.S. PATENT DOCUMENTS

| | | | |
|---|---|---|---|
| 6,154,250 A * | 11/2000 | Honey et al. ............... | 348/157 |
| 6,195,122 B1 | 2/2001 | Vincent ...................... | 348/169 |
| 6,204,813 B1 | 3/2001 | Wadell et al. .............. | 342/463 |
| 6,292,215 B1 | 9/2001 | Vincent ...................... | 348/169 |
| 6,298,170 B1 * | 10/2001 | Morita et al. ............... | 382/278 |

(Continued)

FOREIGN PATENT DOCUMENTS

| WO | WO 99/53339 | 10/1999 |
|---|---|---|
| WO | WO 00/16493 | 3/2000 |
| WO | WO 00/28731 | 5/2000 |

(Continued)

OTHER PUBLICATIONS

U.S. Appl. No. 10/273,871, filed Oct. 18, 2002, Michael Valleriano.

(Continued)

*Primary Examiner*—Nhon Diep
(74) *Attorney, Agent, or Firm*—David M. Woods; Peyton C. Watkins; Stephen H. Shaw

(57) ABSTRACT

A method for correlating tracking data associated with an activity occurring in a three-dimensional space with images captured within the space comprises the steps of: (a) locating a camera with respect to the three-dimensional space, wherein the camera at a given location has a determinable orientation and field of view that encompasses at least a portion of the space; (b) capturing a plurality of images with the camera and storing data corresponding to the images, including a capture time for each image; (c) capturing tracking data from identification tags attached to the people and/or objects within the space and storing the tracking data, including a tag capture time for each time that a tag is remotely accessed; (d) correlating each image and the tracking data by interrelating tracking data having a tag capture time in substantial correspondence with the capture time of each image, thereby generating track data corresponding to each image; (e) utilizing the track data to determine positions of the people and/or objects within the three dimensional space at the capture time of each image; and (f) utilizing the location and orientation of the camera to determine the portion of the space captured in each image and thereby reduce the track data to a track data subset corresponding to people and/or objects positioned within the portion of space captured in each image.

24 Claims, 23 Drawing Sheets

U.S. PATENT DOCUMENTS

| | | | |
|---|---|---|---|
| 6,380,933 B1 | 4/2002 | Sharir et al. | 345/419 |
| 6,567,116 B1 * | 5/2003 | Aman et al. | 348/169 |
| 6,608,563 B2 | 8/2003 | Weston et al. | 340/573.1 |
| 6,710,713 B1 * | 3/2004 | Russo | 340/573.1 |
| 7,177,447 B2 * | 2/2007 | Olson et al. | 382/103 |
| 2002/0008622 A1 | 1/2002 | Weston et al. | 340/572.1 |
| 2002/0101519 A1 | 8/2002 | Myers | 348/232 |

OTHER PUBLICATIONS

U.S. Appl. No. 10/303,363, filed Nov. 25, 2002, Michael Valleriano.
Trakus Company Info Overview, http://www.trakus.com/aboutus.html Trakus Digital Sports Information, Jan. 6, 2003.

* cited by examiner

SPORTS EVENT

| IDENTIFICATION INFORMATION | | | CAMERA ID = 26  FRAME ID = 121 | | |
|---|---|---|---|---|---|
| TAG ID | PARTICIPANT | XYZ LOCATION | IN DoF | IN FOV | PERSON OR OBJECT |
| Aa123465 | JOE | X1, Y1, Z1 | YES | YES | P |
| Aa14567 | TOM | X2, Y2, Z2 | NO | YES | P |
| Aa123492 | HAROLD | X3, Y3, Z3 | YES | YES | P |
| EP213LMX | EAST GOAL | X4, Y4, Z4 | NO | YES | Q |
| 123UW213Q | STEPHANIE | X5, Y5, Z5 | NO | YES | P |
| Aa123639 | MICHAEL | X6, Y6, Z6 | YES | YES | P |
| EP213LPT | REFEREE #3 | X7, Y7, Z7 | NO | YES | P |

FIG. 18

CORRELATING CAPTURED IMAGES AND TIMED 3D EVENT DATA

CROSS-REFERENCE TO RELATED APPLICATION(S)

Reference is made to copending application Ser. No. 10/273,871, entitled "Correlating Asynchronously Captured Event Data and Images" and filed Oct. 18, 2002 in the names of M. A. Valleriano, C. I. Marshall and M. A. Bobb, and copending application Ser. No. 10/303,363, entitled "Correlating Captured Images and Timed Event Data" and field Nov. 25, 2002 in the names of M. A. Valleriano, C. I. Marshall, and M. A. Bobb, which are assigned to the assignee of this application.

FIELD OF THE INVENTION

The invention relates generally to the field of digital image processing, and in particular to the automatic correlation of images with objects in the images or events associated with the images.

BACKGROUND OF THE INVENTION

There are a number of ways to identify a particular person within an image, picture or photo. One typical method provides the person with an identification number, and that identification number is then associated with an image. A few examples of such methods include magnetic stripe cards, bar codes, and radio frequency identification tags that are encoded with the person's identification number. The person's identification number is read before, during or after the image capture and the identification number is associated with the specific image by known methods (e.g., encoding the identification number in the image's metadata or recording the identification information in a database).

Eastman Kodak Co. has a number of products that associate a particular person with an image. For example, Kodak EPX Thrill Shots and Roving Photos, Kodak Image Magic Fantasy Theater and other Kodak products provide the subject with an identification (ID) tag that is associated with an image and used to find the image in an image database and produce a photographic product.

U.S. Patent Application Publication No. US2002/0008622 A1, which was published Jan. 24, 2002, describes a method of associating a particular person with one or more images using a radio frequency identification (RFID) tag. The tags are worn by park patrons during their visit to a park or other entertainment facility. Various readers distributed throughout the park or entertainment facility are able to read the RFID tags and reference unique identifier numbers. Thus, the unique identifier numbers can be conveniently read and provided to an associated photo/video capture system for purposes of providing indexing of captured images according to the unique identifiers of all individuals standing within the field of view of the camera. Captured photo images can thus be selectively retrieved and organized into a convenient photo/video album to provide a photo record of a family's or group's adventures at the park or other entertainment facility.

U.S. Patent Application Publication No. US2002/0101519 A1, which was published Aug. 1, 2002, describes a system such as might be used on a cruise line that more generically associates a person having a tag (e.g. RFID) with a captured image. The system uses a transponder that generates and transmits a unique identification code uniquely identifying the subject of the photographic image to a remote detection unit located within a digital camera. Upon receipt, the unique identification code is verified to correspond with the intended subject of a photographic image, and upon successful verification, the image is recorded. The transmitted unique identification code is encoded in the associated recorded image data, and the data is transferred to a computer-readable storage medium and stored in a database. Once stored, the image can be securely accessed and displayed via a user interface using the associated unique identification code.

The prior art works well for images when one or just a few people are in an image and when the identities of the people can be synchronized with the capture of the images, that is, when the identifier codes and the images are systematically captured together (synchronously) and stored together. However, these systems are not able to handle large numbers of people in a single image and are difficult to apply to multiple images with the same people in each of them. Just as important, these systems are difficult to apply in a situation where the identifier codes are not specifically tied to a particular image, that is, the identifier codes and the images are obtained by systems that are not necessarily synchronized (i.e., asynchronous).

The aforementioned related patent application Ser. Nos. 10/273,871 and 10/303,363 describe methods for identifying people in an image using a simple location detection system based on a single data reading device per image location, and especially where the images are asynchronously captured relative to event data associated with a timed activity. For example, a race may have a timing mat at a specific location on the race course. As a contestant crosses the timing mat, data from an RFID tag is read by the mat and a data record is created. The resulting information is basically two dimensional (2D) in nature (i.e., the mat location on the course), and the location of a contestant when data is read by the timing mat is essentially fixed throughout the race since the mat is not relocated during the race. Meanwhile, a camera is capturing images of the event (e.g., contestants crossing the finish line), but the images are not directly associated with the timed activity (i.e., the images are captured asynchronously in relation to the data record from the timed activity). A correlation algorithm then relates the images to the data record, and thereby to the RFID tag information identifying the people in the images.

However, there are certain situations where the location of the person being photographed can vary across a large volume of space. For example, in a sporting event such as a hockey, football or soccer game, players may be anywhere on the field or on the periphery of the field. Images of these players may be taken while they are anywhere within the sports field or arena. This situation requires a three dimensional (3D) tracking system to locate players during a sporting event.

One three dimensional tracking system for a sports event is described in WO 00/28731 (Orad Hi-Tec Systems Limited). This document describes an interactive television system using video and/or television cameras to image a sporting event, such as a game. RF or microwave sensing equipment is used to identify players and objects, and triangulation is used to determine the positions of players and objects during the game. Position data is transmitted separately or combined with the video images. The positional information for the players and objects is used to display game and player information on a video or TV screen for viewers.

Another three dimensional tracking system for a sporting event is described in U.S. Pat. No. 6,204,813 (Trakus Inc.). This document describes an RF tracking system using spread spectrum radio transceivers, a signal processor, a database engine and a processor to identify players and objects and relate stored biographical data to the players. The system provides an image of both the on-going game and information about the players on TV or other communication channels, such as the Internet.

Both of these three dimensional tracking systems track the location of players and objects during a sporting event, and provide images and data for commercial imaging channels such as TV or the Internet. (Such imaging channels are characterized herein as productive of "low quality" images, where such low quality images are typically motion images or still images with low resolution, limited color fidelity or some other reduced image quality characteristic.) However, such sporting events often have independent photographers with high quality imaging equipment (typically, still film cameras or high-resolution digital cameras) that operate independently of the three dimensional tracking system used for the commercial channels. Currently, there is no way for such independent photographers to relate their high quality images with the player and location information contained within the tracking system. Also, the three dimensional tracking systems, as utilized with TV or the Internet, provide no way for the viewers or players to obtain high quality still images of players or game action.

A method is needed to easily associate (1) high quality images with player identification and biographical information, allowing identification of all the players within a particular image, and also to easily locate all images that include a particular contestant; and (2) allow viewers of the three dimensional tracking systems to obtain high quality images of players and game action. Such a method is particularly needed in a system where the data about the event, including the identities of the players, is asynchronously captured in relation to the high quality images, such that there is seldom a clear one-to-one relationship between the event data and the images.

SUMMARY OF THE INVENTION

The present invention is directed to overcoming one or more of the problems set forth above. Briefly summarized, according to one aspect of the present invention, a method for correlating tracking data associated with an activity occurring in a three-dimensional space with images captured within the space, wherein remotely-accessible identification tags are attached to people and/or objects associated with the activity, comprises the steps of: (a) locating a camera with respect to the three-dimensional space, wherein the camera at a given location has a determinable orientation and field of view that encompasses at least a portion of the space; (b) capturing a plurality of images with the camera and storing data corresponding to the images, including a capture time for each image; (c) capturing tracking data from the identification tags attached to the people and/or objects within the space and storing the tracking data, including a tag capture time for each time that a tag is remotely accessed; (d) correlating each image and the tracking data by interrelating tracking data having a tag capture time in substantial correspondence with the capture time of each image, thereby generating track data corresponding to each image; (e) utilizing the track data to determine positions of the people and/or objects within the three dimensional space at the capture time of each image; and (f) utilizing the location and orientation of the camera to determine the portion of the space captured in each image and thereby reduce the track data to a track data subset corresponding to people and/or objects positioned within the portion of space captured in each image.

The advantage of the invention lies in its ability to easily correlate asynchronously captured event data and images in a three dimensional volumetric space on a playing field. As a result, in a sporting event occurring on a playing field, it is possible to easily identify and associate all the players within a particular image of the playing field, and also to easily locate all images of the playing field that include a particular player.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 18 is an example of a listing of data for selected tag IDs obtained from data stored in the databases.

DETAILED DESCRIPTION OF THE INVENTION

Figure 1:
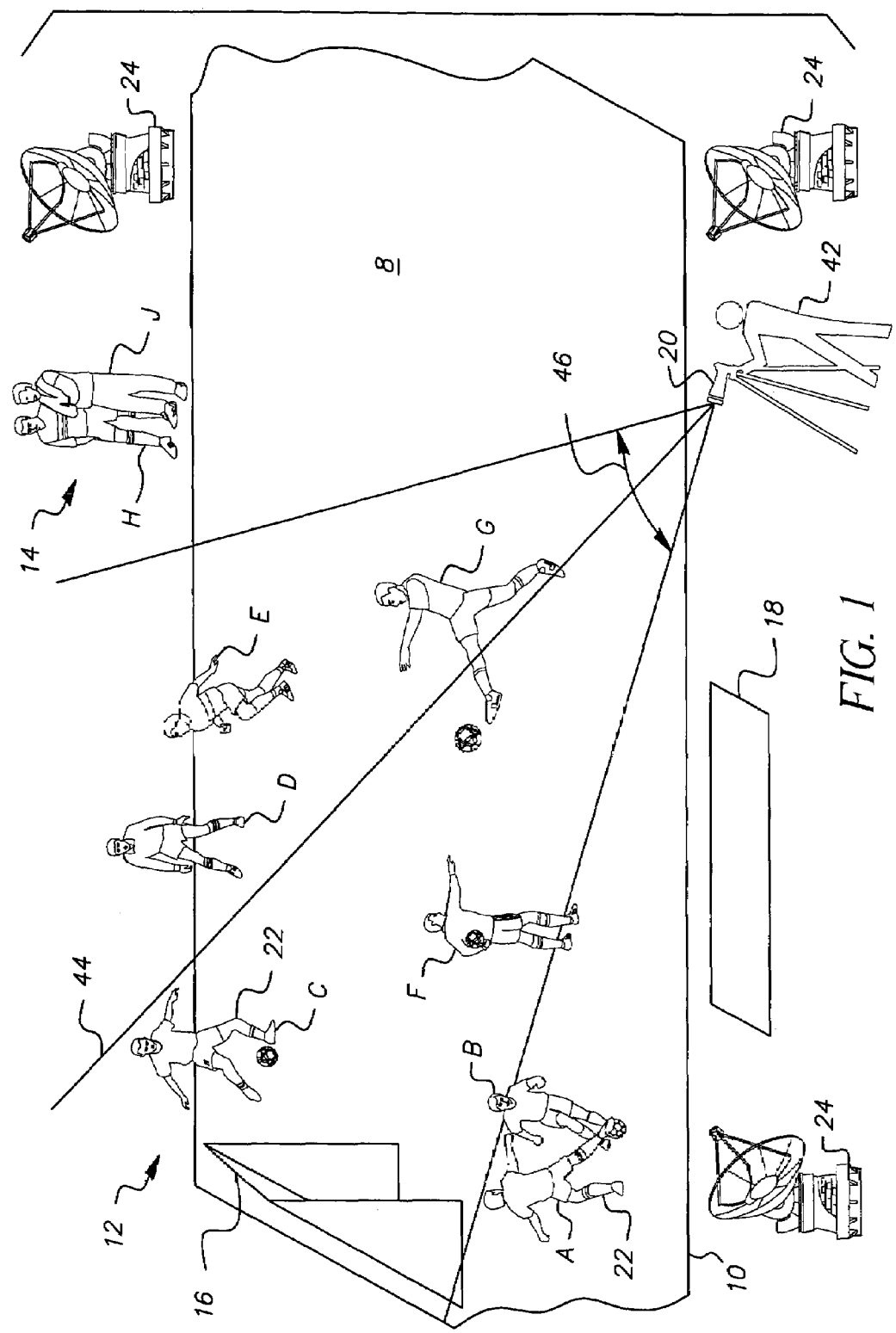
FIG. 1 is a pictorial illustration of a playing field, wherein a photographic and tracking system is used according to the invention to capture and identify images of players that are within a defined volume or space.

Because image processing systems employing correlation and retrieval techniques are well known, the present description will be directed in particular to attributes forming part of, or cooperating more directly with, a method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts. If the invention is implemented as a computer program, the program may be stored in a conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

The advantage of correlation, as described in the cross-referenced Ser. No. 10/303,363, is understood with the example of a foot race. Races such as a marathon or ironman race typically have many contestants. Photographs of the contestants may be taken at the beginning of the race, at the finish line, or at any point along the race course. These photos may show a few people, but typically contain many people. Also, many photos may be taken throughout the race, and a given person could appear in a number of these photos. Similar situations occur at other events such as graduations, walks for charity, and so on.

At a race, the contestant initially registers by providing personal information that is stored in a registration database. The contestant is issued a Contestant ID number (CID) that is recorded in the registration database. The CID is also provided on a bib, badge, pass or other article that the contestant can carry or wear. In the prior art, for example, the article could also contain an RFID tag. Consequently, these articles include the CID and a unique tag article ID (TID) number. Information relating the CID and the TID is recorded in an article database (which could be different from the registration database).

For instance, the contestant is provided with a bib having a CID and an RFID tag with the TID; optionally, the RFID tag may also have the CID. It is possible for the RFID tag to be incorporated into the bib, or it might be a separate item such as a wrist or ankle band for wearing.

Data gathering stations are located at one or more points around the race course. Each data gathering station includes a means (e.g., timing mats laid across the course) to read information from the RFID tag (or other article) as the contestant passes the station, and a way to associate that information with other data such as time, location, lap, etc. that is obtained from separate race timing apparatus. This information is stored in a race time database. The data gathering station may also include at least one camera that captures one or more images as the contestant races past the station. Ordinarily, the camera associates data such as time of capture, image number, camera number, etc., with the image in a camera image database. The challenge is to correlate the information from the various databases using the CID, TID, time, location and other data.

In cross-referenced Ser. No. 10/303,363, a method is described to associate all the contestants within a given photo with that particular image, and also to locate all images that include a particular contestant. Such a method is particularly useful in a system where the data about the event, including the identities of the contestants, is asynchronously captured in relation to the images such that there is seldom a clear one-to-one relationship. To provide correlation, a time-based window is generated that interrelates event data in the race time data base with images in the camera image database having a time of capture within the window. Once that relationship is established between the event data and the images, the race time data base can relate the images to the identification of the race contestants that would likely be in the images for that segment of the event.

Figure 21:
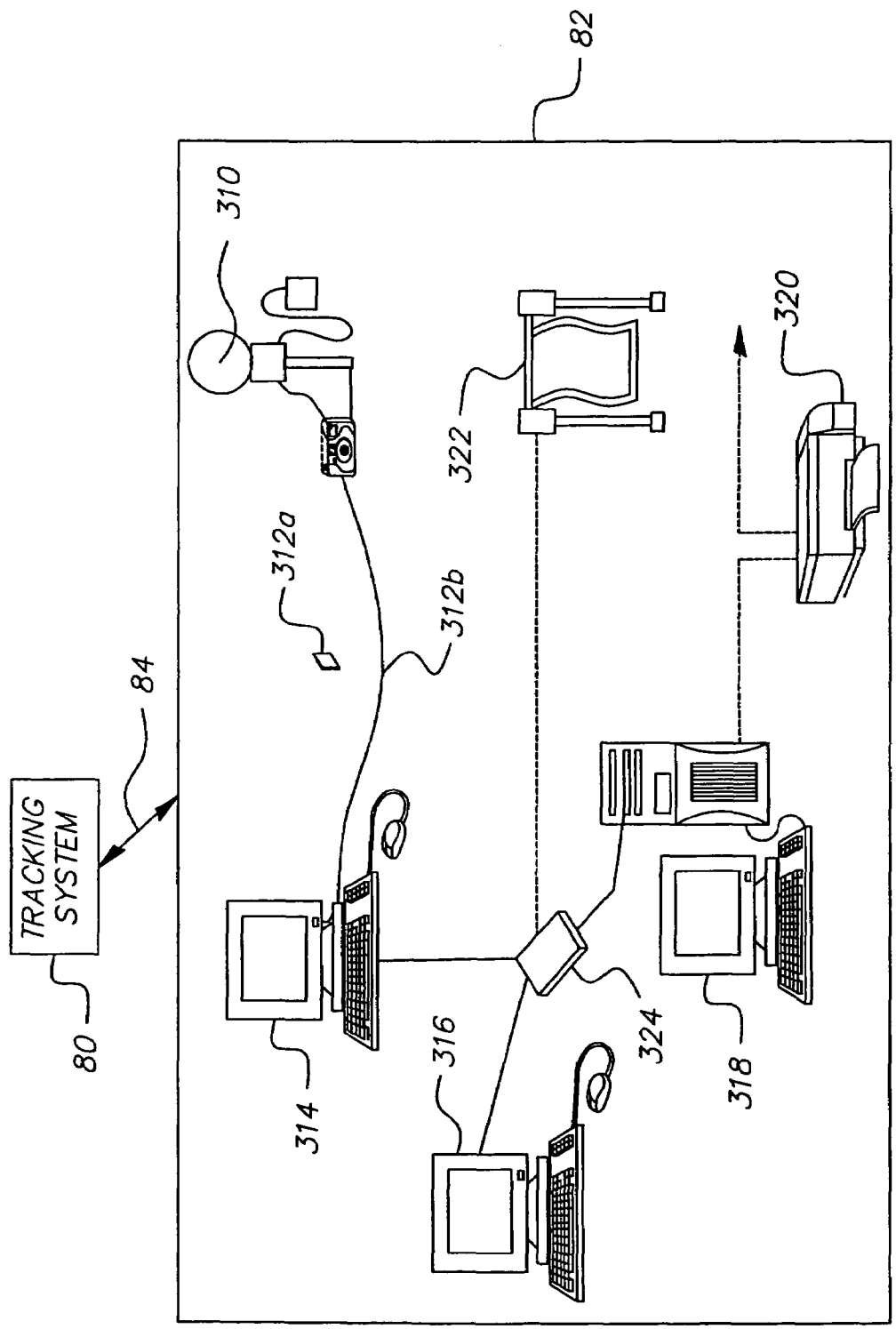
FIG. 21 is a pictorial diagram of a computer system for implementing the present invention.

Referring first to FIG. 21, there is illustrated a computer system for implementing the present invention. Although the computer system is shown for the purpose of illustrating a preferred embodiment, the present invention is not limited to the computer system shown, but may be used on any electronic processing system such as found in personal desktop or laptop computers or workstations, or any other system for the processing of digital images. The Kodak EPX system, a professional image operating system offered for the entertainment industry, serves as the basis for the photographic system used in this embodiment. This system includes one or more cameras 310 (which are preferably either digital cameras capable of storing a considerable range of meta data (time, date, etc.) related to the captured images or film cameras capable of recording similar data on a magnetic region of the film (e.g., on APS film) or on an ancillary recording device). Images are captured by one or more of the cameras 310 and entered into the EPX system via removable storage media 312*a* (e.g., a Compact Flash card) or by a tethered (or wireless) link 312*b* between the camera 310 and a download computer 314. A point of consumer (POC) computer 316 is used to find, preview, edit and select images for output. Images selected for output are processed and print queues are managed by a print server 318 for output to a printer 320 or to a poster printer 322. Note that all of these computer functions are coordinated by a network switch 324, but could be implemented on a single computer, or any other number, or combination, of computers as required.

Additional computers (not shown) could be added to the system for additional functions. For example, a preview computer could be used to display images on preview monitors to entice players and other customers to the sales location. A dedicated operator computer could be provided for backroom operations. Other computer system architectures are possible, and many have been implemented in Kodak EPX installations. Relative to a subsequent description of the present invention, the computer system shown in FIG. 21 is referred to as the imaging system 82, which interrelates via an arrow 84 (which may comprise software) with a tracking system 80.

Unlike a race, where contestants follow a defined path that intersects timing mats in defined locations, images may be captured at an event where people and objects travel throughout a defined volume of space. Such an event may be a sports event such as a soccer, hockey or football game, or it may be any gathering of people within a defined space, such as an assemblage of people for a meeting (e.g., a political convention).

FIG. 1 shows a playing field 8 within which players within a defined space are photographed according to one embodiment of the instant invention. A sports event such as a soccer game is typically played on such a defined field. The field typically includes a boundary 10 within which the game is played by a group of active players 12, and outside of which non-active players, coaches and others on-lookers 14 may congregate. The field often includes locations of special interest, such as a goal post 16, and team bench or penalty box 18.

Figure 8:
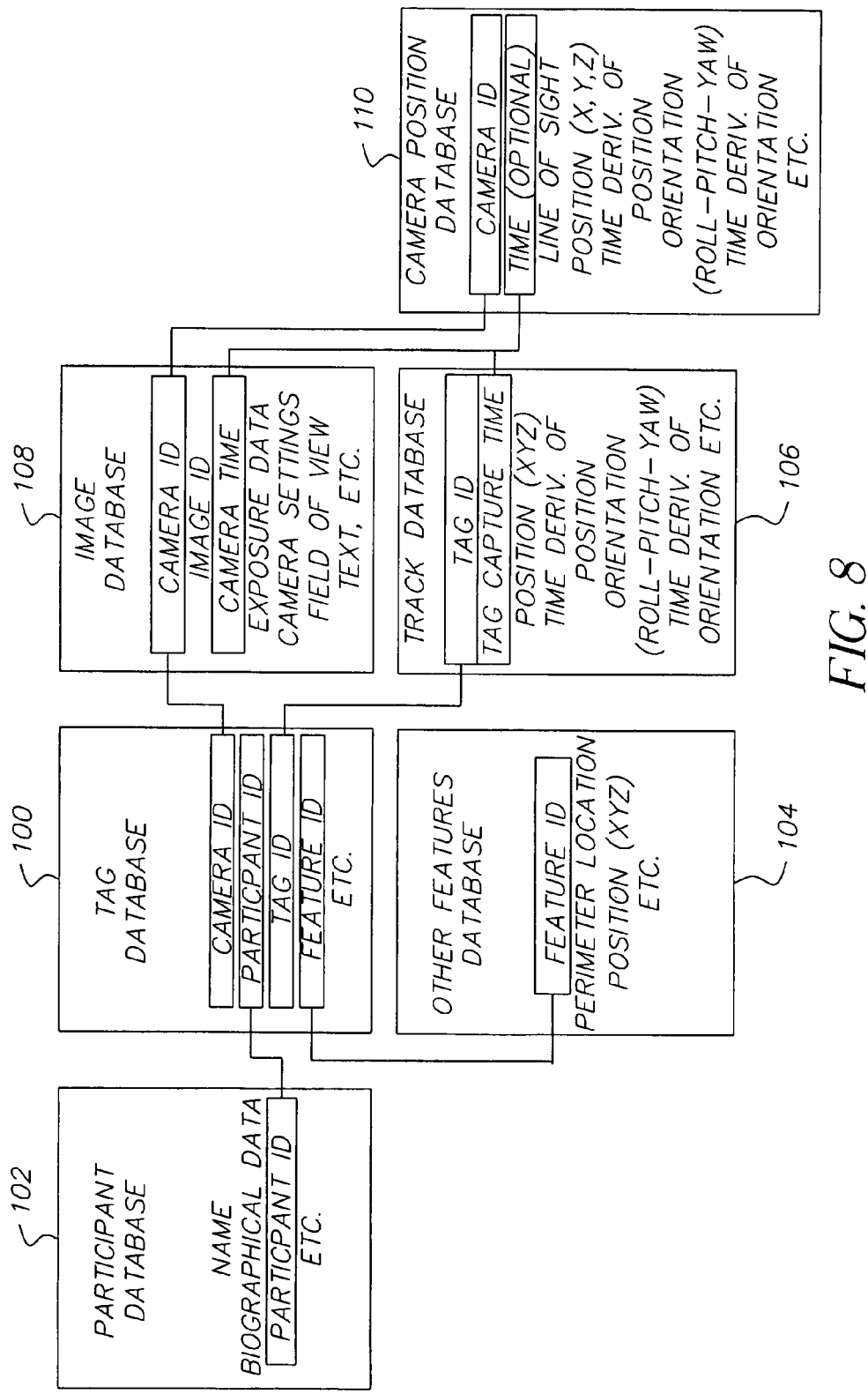
FIG. 8 is a diagram of the various databases used in the playing field embodiment and their interrelationships.
Figure 20:
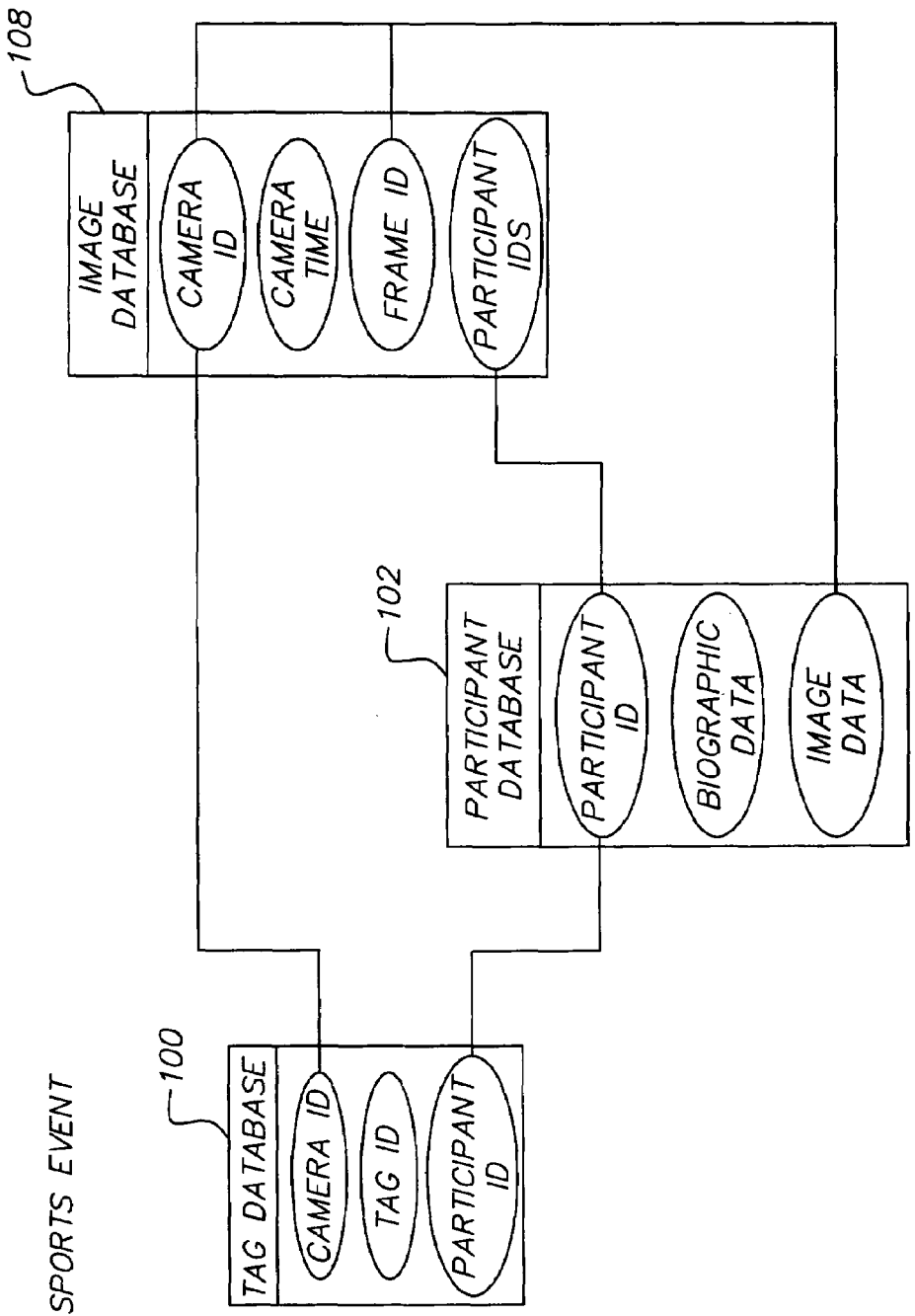
FIG. 20 shows the interrelationship of the data in several of the databases.

An objective of the present invention is to provide identification of all players, e.g., players C, D, E, F and G, that are within an image captured by a camera 20 (in one embodiment, the camera 20 is one of the digital cameras 310 shown in FIG. 21). Such identification information is stored in a database environment. In the following description, and as shown in FIGS. 8 and 20, database information will be referred to as existing in separate databases such as a tag database 100 or a participant database 102. It is well known to those in the database arts that such independent databases could be variously located in either the imaging system 82 or the tracking system 80, or can be combined or distributed in many alternative combinations between or apart from these systems, including one large database in one venue. All of these alternative combinations are included within the scope of this invention.

Within an existing and conventional tracking system, information about some or all of the players, coaches, referees, on-lookers, photographers, and the like is entered into a participant database 102 (see FIG. 8). For players in particular, this information may include biographical data, player performance statistics, participant ID, and any other data of interest. Information about objects of interest (e.g., a goal, a penalty box or a camera) may be entered in the participant database 102 or in an optional other features database 104 (see FIG. 8). Object information may include a description, "participant" or camera or feature ID, etc. If the object has a fixed location (such as along the boundaries of the field), this database may include information on the object's location (based on XYZ coordinates), perimeter location, etc.

Figure 2:
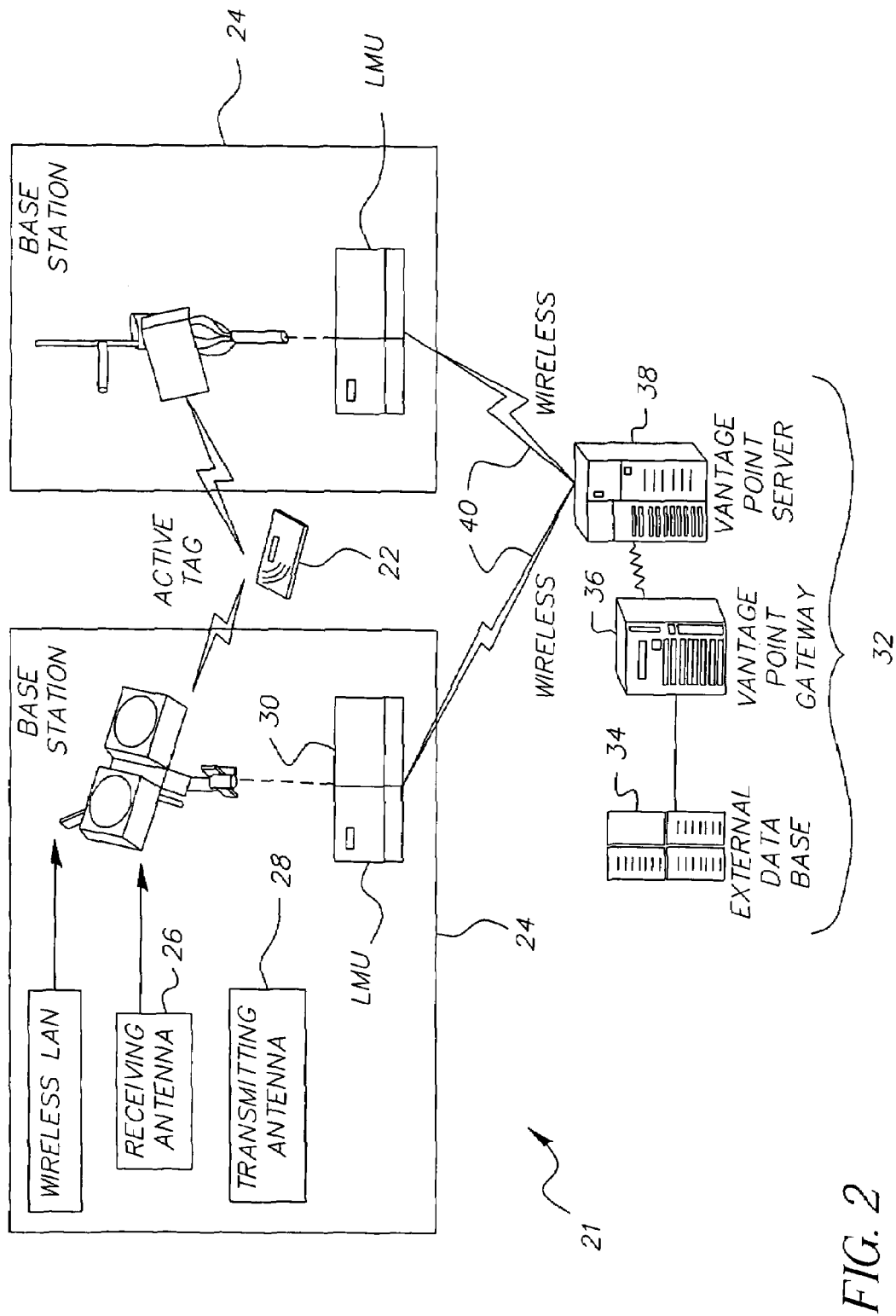
FIG. 2 is a pictorial illustration of a tracking system that is useful in the playing field embodiment shown in FIG. 1.

As explained heretofore, participants (and objects of interest) have an article that identifies them uniquely through a non-contact communication method (e.g., an RFID tag, etc.). For instance, a tag 22 (see FIGS. 1 and 2) is provided to players and objects on a bib, badge, pass or other article that a player or other object may carry or wear so that their locations during the event may be tracked, and the appropriate tag identification information is entered into the tag database 100. Each tag 22 contains a tag identification (tag ID) that is unique for each player and each object. Information entered into the tag database 100 (see FIG. 8) thus relates the tag ID to a participant ID, a camera ID, a feature ID, etc. These tags may utilize any tracking technology known to those skilled in the art, such as RF, microwave, optical, magnetic, etc. RF tags may be active or passive in nature. For the purposes of this description, we will assume active RF tags are used. A tracking system 21 employing an active RF tag 22 is shown in FIG. 2; wearable tags of this type are well known; for example, see the tag described in International Publication Number WO 00/16493, which was published 23 Mar. 2000.

One or more tracking stations 24 are located around the periphery of the field 8 shown in FIG. 1. As shown in more detail in FIG. 2, these tracking stations 24 may include one or more antennae, e.g. a receiving antenna 26 and a transmitting antenna 28, an electronics portion 30 that may include a transmitter and/or a receiver (sometimes referred to as a transceiver 30 or a transponder), and a means to communicate to a remote computer 32 including an external database 34 networked through a gateway 36 to a server 38. The communication capability may comprise a wireless transmission 40 between the transceiver 30 and the server 38. Other communication capabilities may be employed, such as a tethered connection between the electronics portion 30 and the server 38. Active tags 22 transmit data periodically, or on command. Tag data may include a unique identifier (tag ID) as well as other information, such as battery power level. Data from the tags is received by the tracking stations 24, where it is recorded with information about the time the data was received. The timing data may be provided by the electronics portion 30, which for this purpose includes a clock, or access to a clock, or the timing data may be provided by the remote computer 32.

Referring to FIG. 8, received tag data including the tag capture time is typically stored in a tracking database 106. The tracking database may be distributed among the tracking stations 24 or it may be centralized in the remote computer 32. Data from the one or more tracking stations 24 is typically sent to a remote computer via a network (e.g., the wireless network 40). This embodiment will describe a wireless network, although other methods known to the art may be used, such as a wire cable, an optical cable, etc.

The remote computer 32 then processes the tracking data to determine the location of each tag 22, and the player or object that the tag is attached to, throughout the sports event. In conventional tracking system applications, the player or object information obtained from processing in the remote computer 32 is combined with the video feed from conventional TV cameras (which are not shown in FIG. 1) which are televising the game. For example, information from the tag database 100 and the tracking database 106 may be used to locate biographical information or individual statistics from the participant database 102 for display on a low image quality display (e.g., broadcast video quality display) such as a TV, video or Internet output device. Examples of such low quality (or motion) output are exemplified by video applications involving tracking systems provided by Trakus, Inc., Everett, Mass.

According to one embodiment of the present invention, one or more photographers 42 may be located anywhere within the defined volume of space comprising the playing field shown in FIG. 1, or outside of but with optical access to the defined volume of space of the playing field 8 (e.g., a photographer 42 with a telephoto lens, as shown in FIG. 1, located outside the defined volume of space of the playing field 8). These photographers are typically equipped with high quality camera equipment 20 (e.g., film cameras or high resolution digital still cameras) that is independent of the existing tracking system 24. Typically, the photographic output of the camera equipment 20 is processed and utilized independently of the contemporaneous television production, e.g., for newspaper coverage of the game. However, these photographers may have tags 22 and information entered into the participant database 102.

Each camera 20 has a particular orientation determined by a line of sight 44 and a field of view 46, as shown in FIG. 1. The camera records the images of all objects and players within the camera's field of view 46, as determined by the position of the line of sight 44. Typically, the camera 20 is a digital camera and ancillary image data may be captured and recorded with the digital image (although with certain film cameras, e.g., APS cameras, ancillary image data may be recorded on the film together with the image). Image data recorded with a captured image includes such information as camera ID, photographer ID, camera field of view, camera line of sight, lens focal length, exposure data, etc. The camera equipment also includes a clock for recording the camera time at the moment of image capture. Referring to FIG. 8, this data is stored in the image database 108, which may exist as part of the EPX system shown in FIG. 21, e.g., as part of the download computer 314.

Figure 4A:
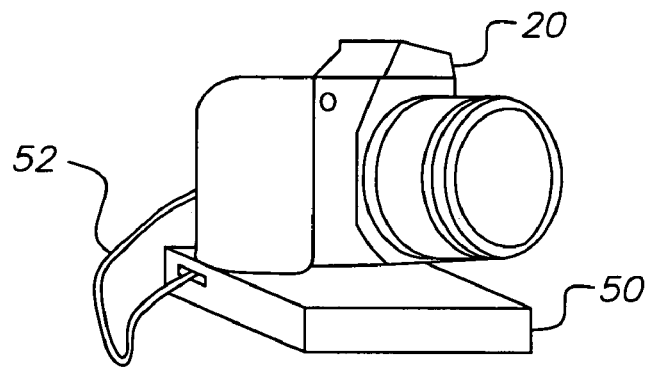
FIGS. 4A and 4B show two configurations of a digital camera used in the playing field embodiment shown in FIG. 1, one (4A) in which tracking data is stored with the image and one (4B) in which tracking data is wirelessly transmitted to a remote computer.
Figure 4B:
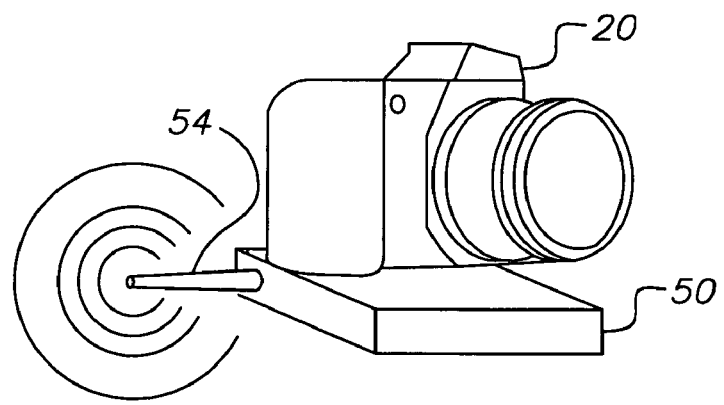
Figure 6:
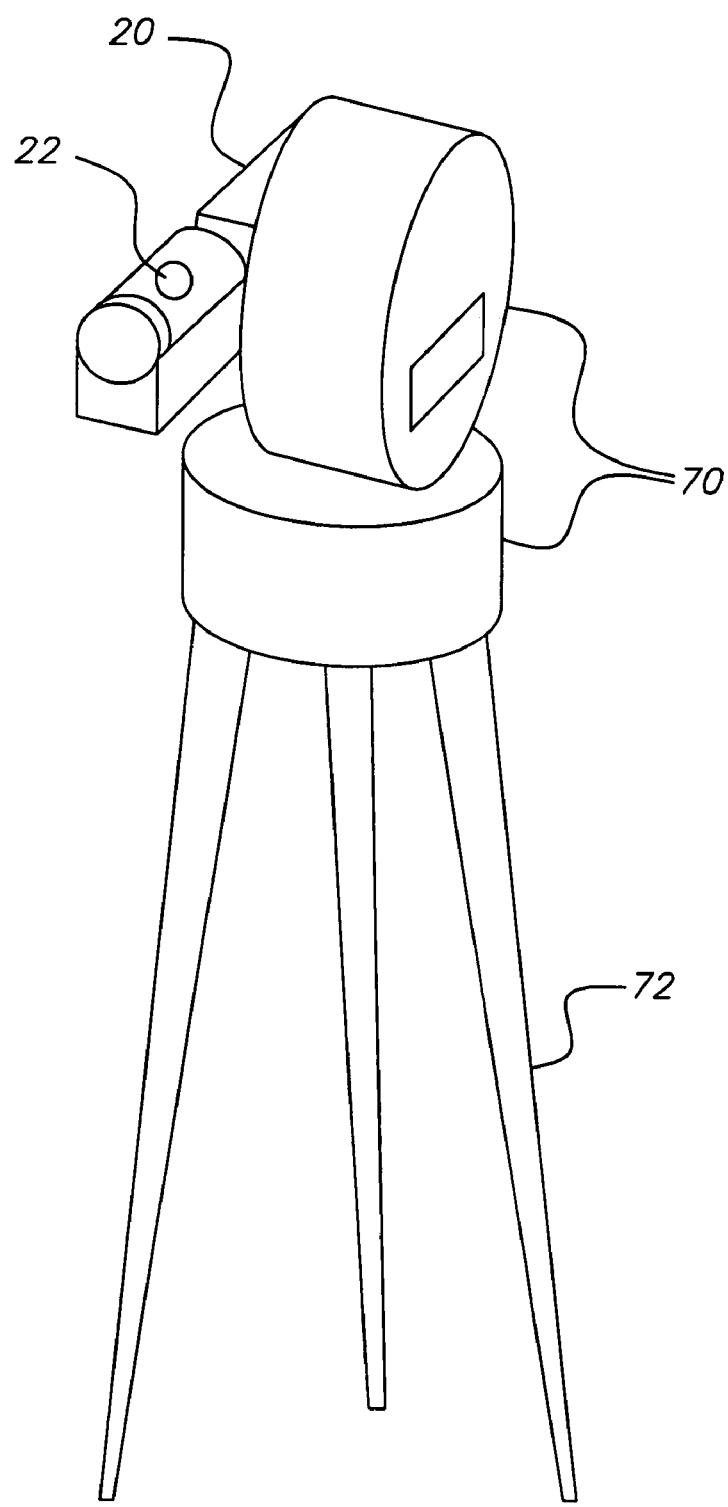
FIG. 6 shows a camera mounted on a mechanized gimbal for determining line of sight data.

Camera line of sight data may be determined using any technology known to those skilled in the art. As shown in FIG. 6, according to one such technology, the camera 20 is mounted to a tripod 72 and attached to a mechanized gimbal 70 that measures angle and azimuth readings, which is communicated to the camera for recording with the image data. According to another technology, as shown in FIGS. 4A and 4B, a tracking data acquisition unit 50 is attached to the camera 20, where the unit 50 can either send data to the camera for storage with the image via a data link 52 (FIG. 4A) or transmit tracking data to a remote location via a wireless transmitter 54 (FIG. 4B). In such a system, as shown in greater detail in U.S. Pat. No. 6,292,215, the data acquisition unit 50 includes a vertical gyroscope (not shown here) and a directional gyroscope (not shown here) that are orthogonally mounted on a stable inertial platform relative to each other. The vertical gyroscope, aligned along an X or Y axis, measures yaw (rotation about the Z axis), while the directional gyroscope, aligned along the Z axis, measure both roll (rotation about the Y axis) and pitch (rotation about the X axis). It may also be possible to combine multiple tracking technologies, such as GPS or GIS technologies or position sensors on the camera, to determine where a camera is located and the direction of its line of sight. In each case, the positional data that is obtained from the various methods as recorded in an appropriate database, such as a separate camera position database 110 (FIG. 8), which may exist as part of the EPX system shown in FIG. 21, e.g., as part of the download computer 314.

Figure 5A:
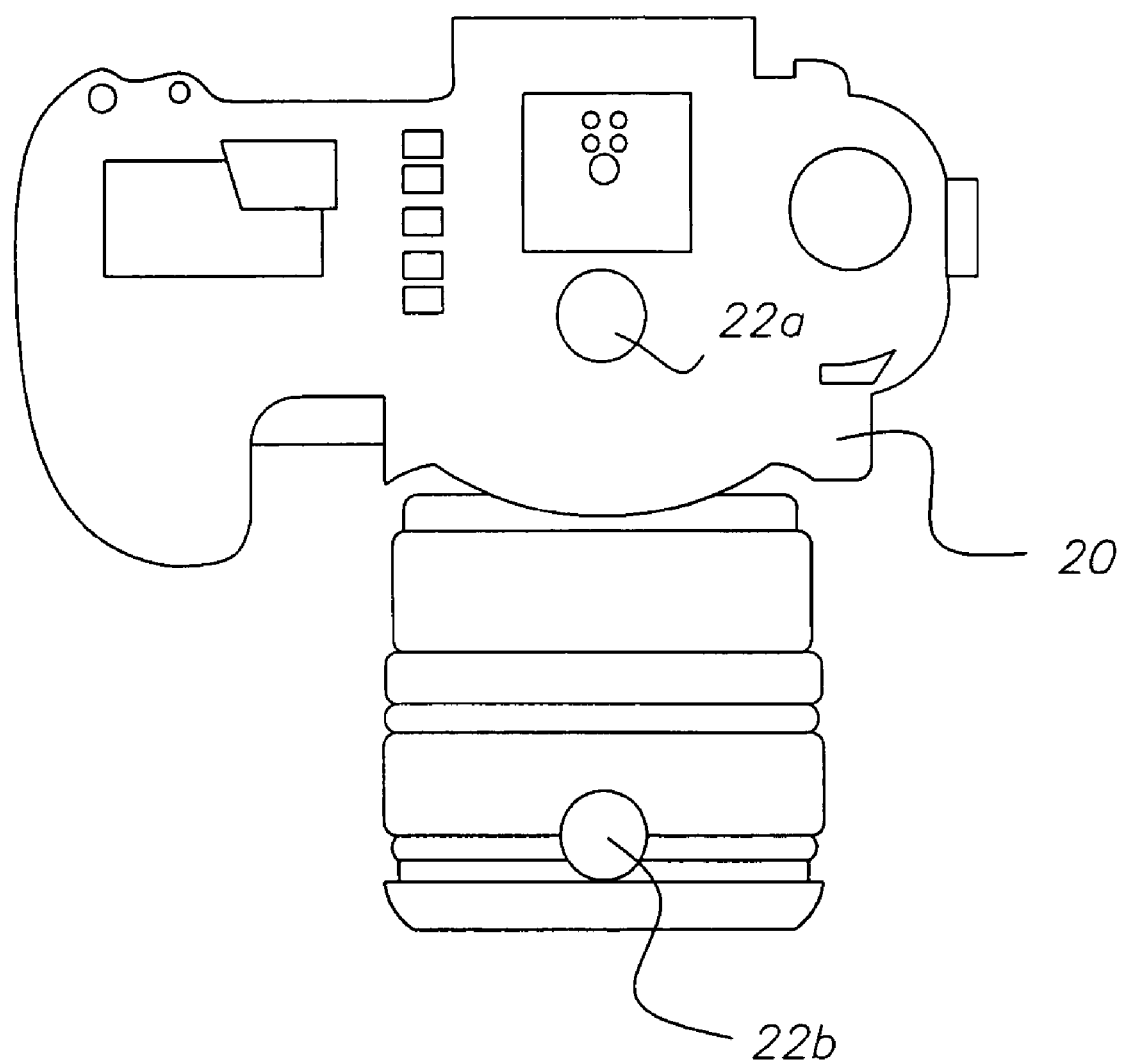
FIGS. 5A, 5B and 5C shown three embodiments for tag placement with a digital camera, including a first (5A) with RFID tags on the camera body, a second (5B) with RFID tags on a single axis bar supporting the camera, and a third (5C) with RFID tags on a two-axis bar supporting the camera.
Figure 5B:
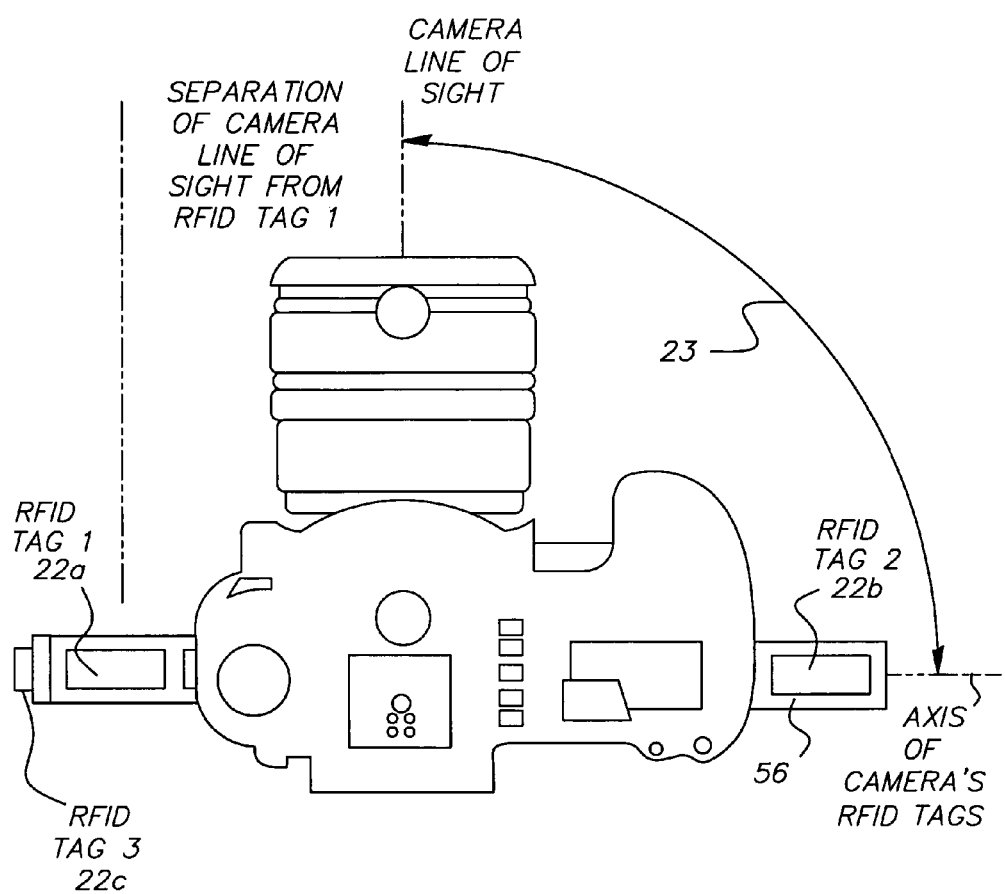
Figure 5C:
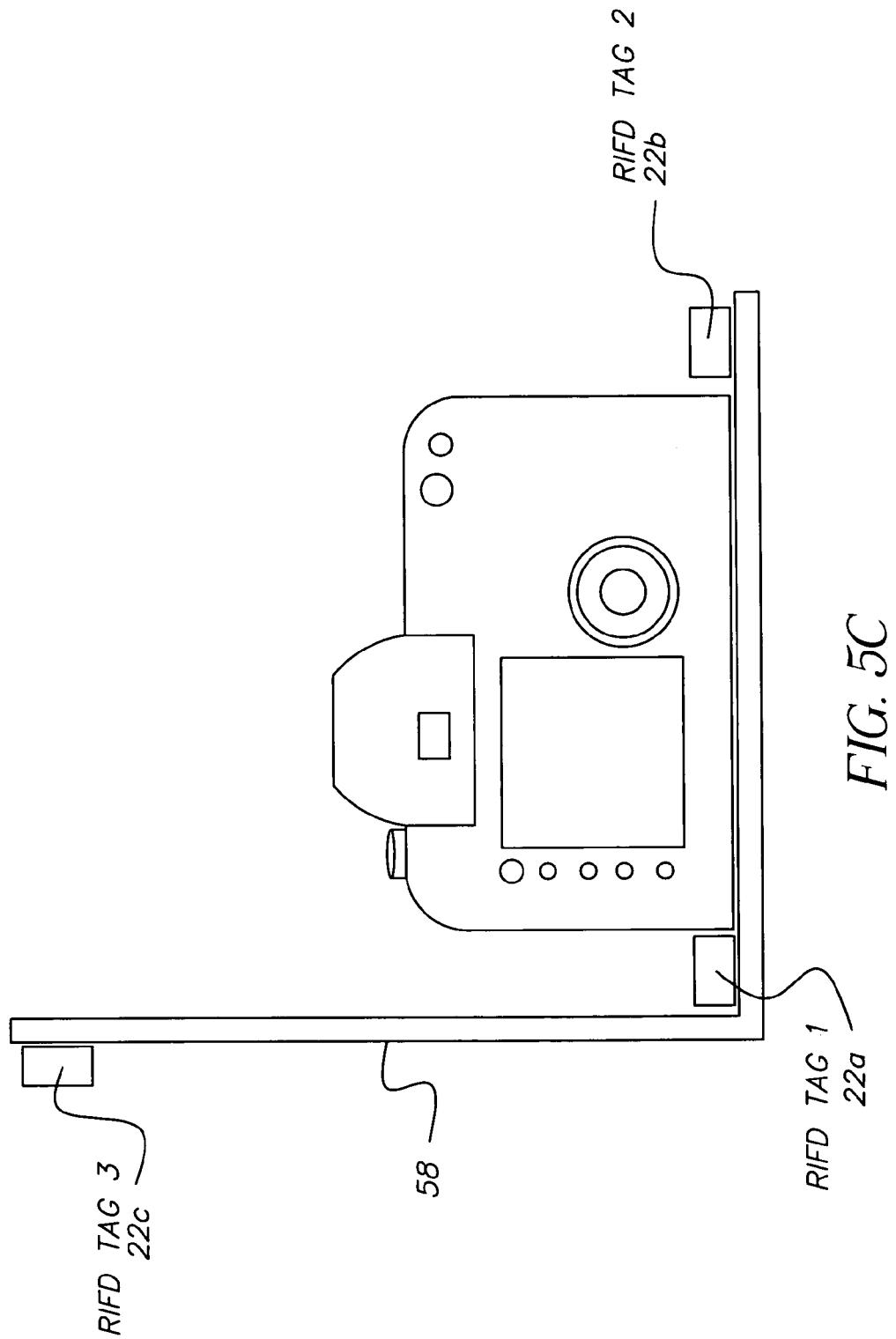

According to another approach for determining the camera line of sight, as shown in FIGS. 5A, 5B and 5C, multiple RFID tags 22a and 22b may be attached to the camera 20 (FIG. 5A) and used by the tracking system 80 to convert the three-dimensional location data obtained from the multiple camera tags to camera line-of-sight data. Another implementation of RFID tags is to attach multiple tags 22a, 22b and 22c to a fixture 56 which is in turn attached to the camera 20 as shown in FIG. 5B. In this example, the angle 23 between the line connecting the tags and the camera's line of sight is recorded in one of the databases (i.e., either in the participant database 102, the other features database 104 or the camera position 110 database). If the location resolution of the tracking system is sufficient, it may also be desirable to record the separation distance of the camera line of sight from one of the tags on the fixture, or it may be assumed that the camera line of sight is located equidistant between the tags on the fixture. The distance between the tags on the fixture is determined by the resolution of the tracking system. It may sometimes be desirable to provide at least three tags 22a, 22b, 22c on a 2-axis fixture 58 to obtain line of sight information in two planes of orientation (FIG. 5C).

Figure 9:
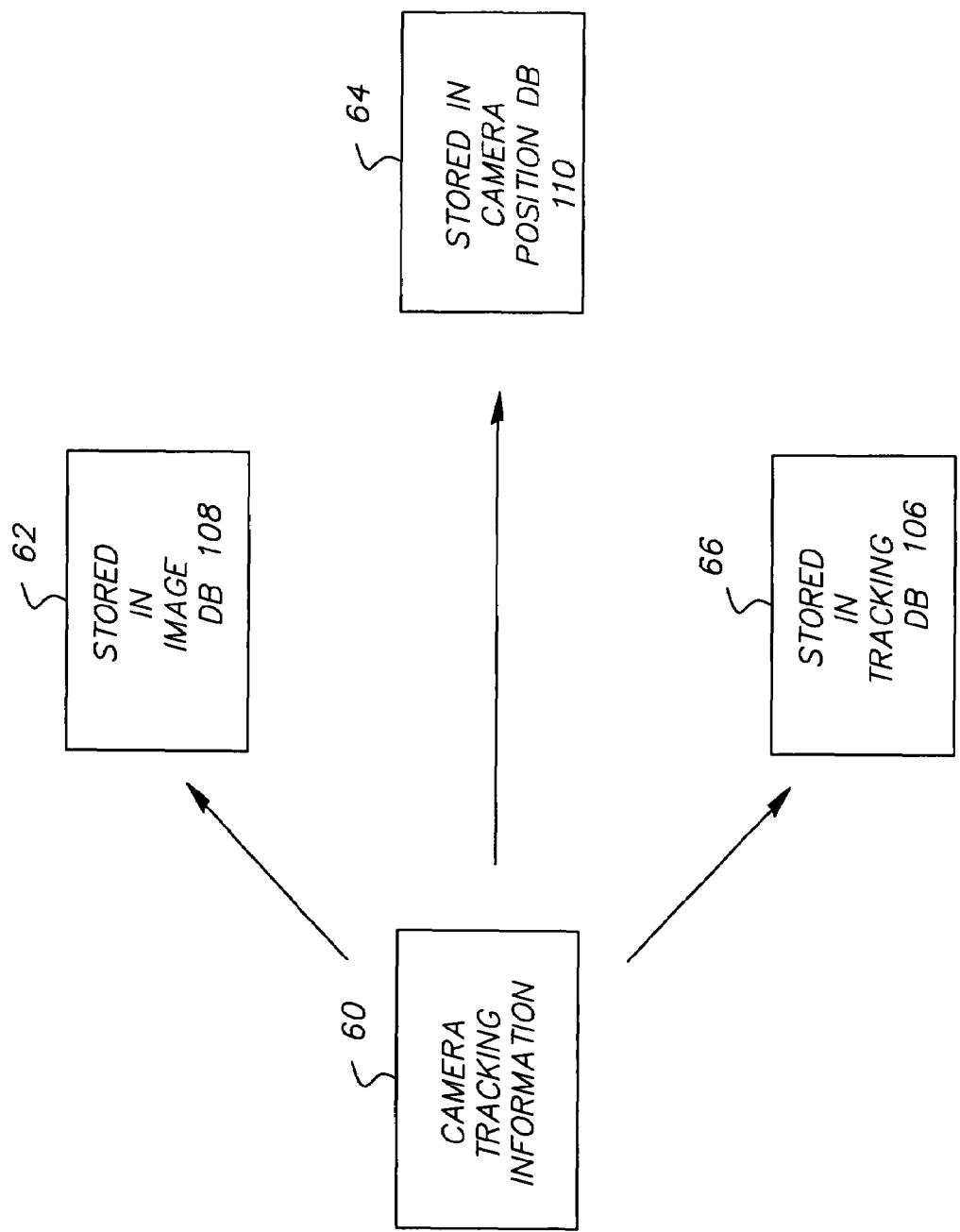
FIG. 9 is a diagram showing various locations for storing the camera tracking information.

As shown in FIG. 9, camera tracking information 60 may be stored in a variety of locations. In some embodiments, this information 60 can be stored (storage step 62) with the image information in the image database 108. In another embodiment, camera tracking information 60 can be stored (storage step 64) in the camera position database 110. In yet another embodiment, the camera tracking information 60 can be stored (storage step 66) in the tracking database 106, or in other locations as desired.

Figure 7A:
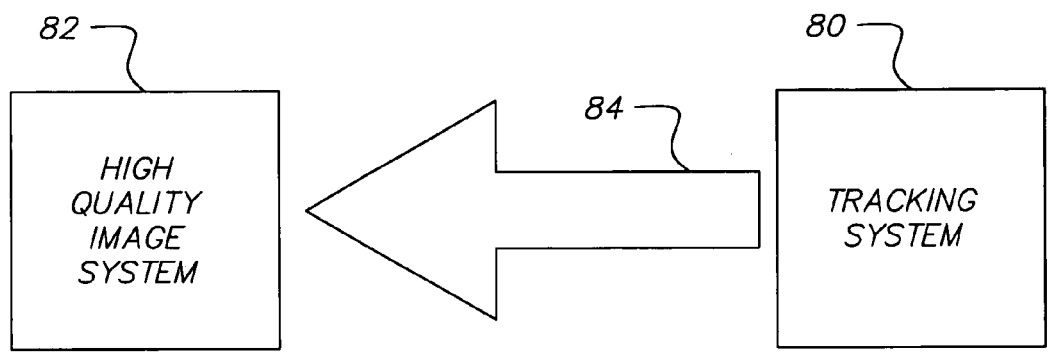
FIGS. 7A and 7B show two approaches to implementation of the invention.
Figure 7B:
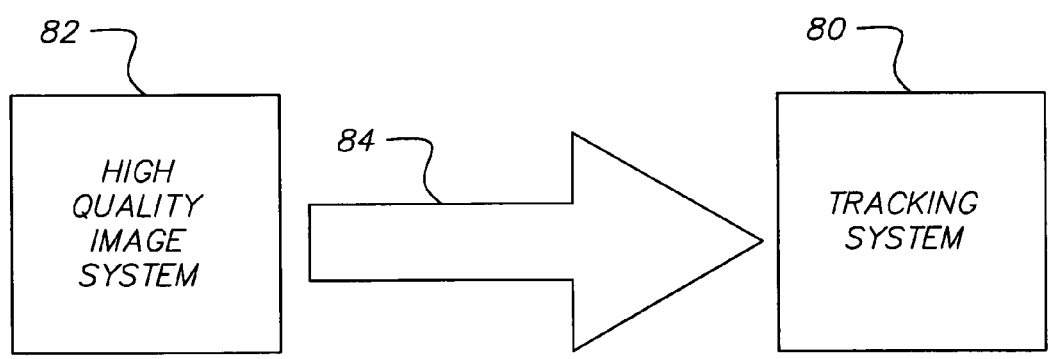
Figure 11:
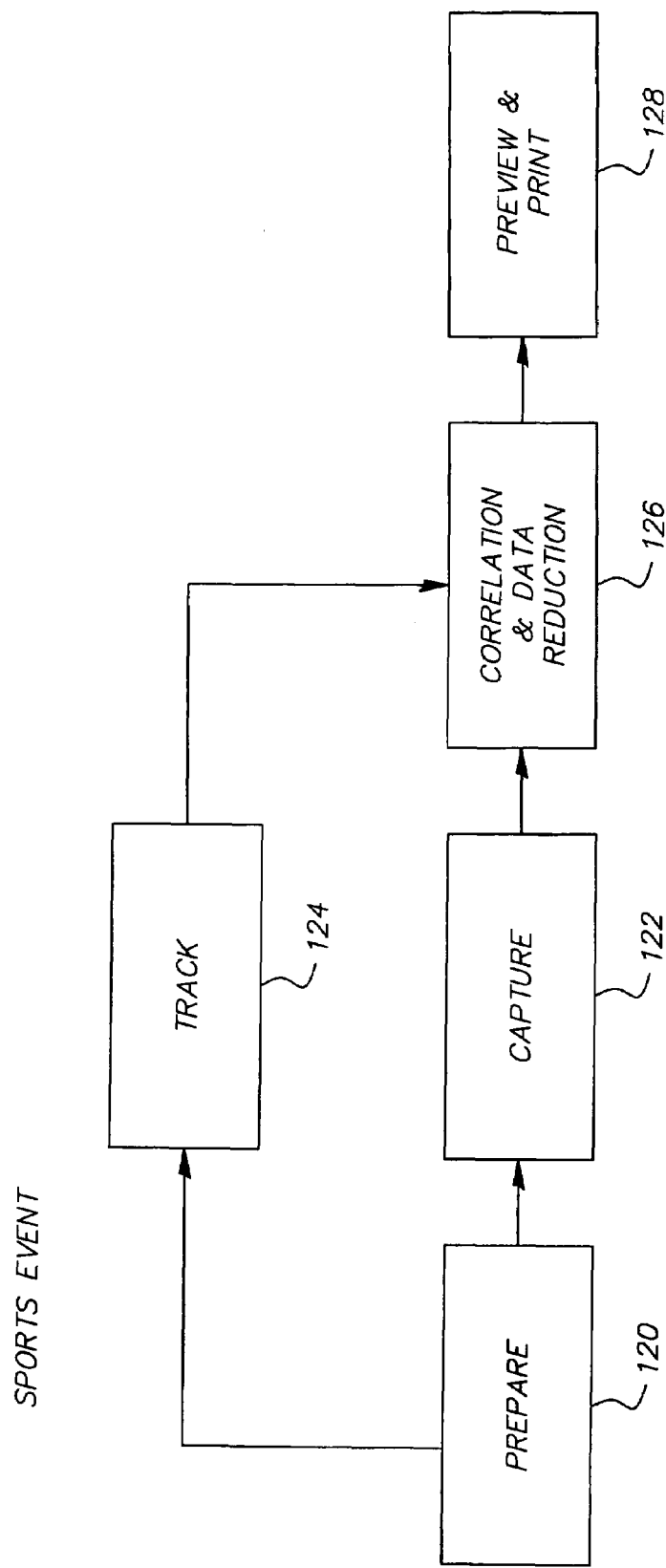
FIG. 11 is a block diagram of the basic functions performed according to the present invention.

Examples of how the present invention can be implemented will now be discussed. There are two approaches to implementation of the benefits of the invention. As shown in FIG. 7A, the tracking system 80 can be used to identify people and objects captured by the high quality imaging system 82, often as a precursor to providing high quality reproductions of selected images to parties interested in seeing certain people or objects. On the other hand, as shown in FIG. 7B, the high quality imaging system 82 may provide input images to the low quality viewing system, e.g., TV or the Internet, that is driven by the tracking system 80. The invention involves the capability to correlate the output of an existing tracking system 80 as represented in FIG. 2 with the output of an imaging system 82 represented by the camera 20 in FIG. 1 and the system shown in FIG. 21. As shown in FIGS. 7A and 7B, this correlation capability is included either in the high quality image system 82 or as an upgrade to the tracking system, as represented by the tracking system 80, or as a separate intermediary process represented by the arrows 84. Any combinations or variations on these implementations are also part of this invention. For either of these implementations, FIG. 11 shows the basic functions performed according to the invention, including a preparation function 120, a capture function 122, a tracking function 124, a correlation and data reduction function 126 and a preview and print function 128. Each of these functions will now be discussed in greater detail in regard to the respective implementations.

First Implementation: Using Tracking Data to Identify People and Objects within an Image In this implementation, and as shown in FIG. 7A, information from the tracking system 80 is used to identify people or objects of interest within a high quality image provided by the high quality image system 82. This example involves a soccer game.

Preparation Function

Figure 12:
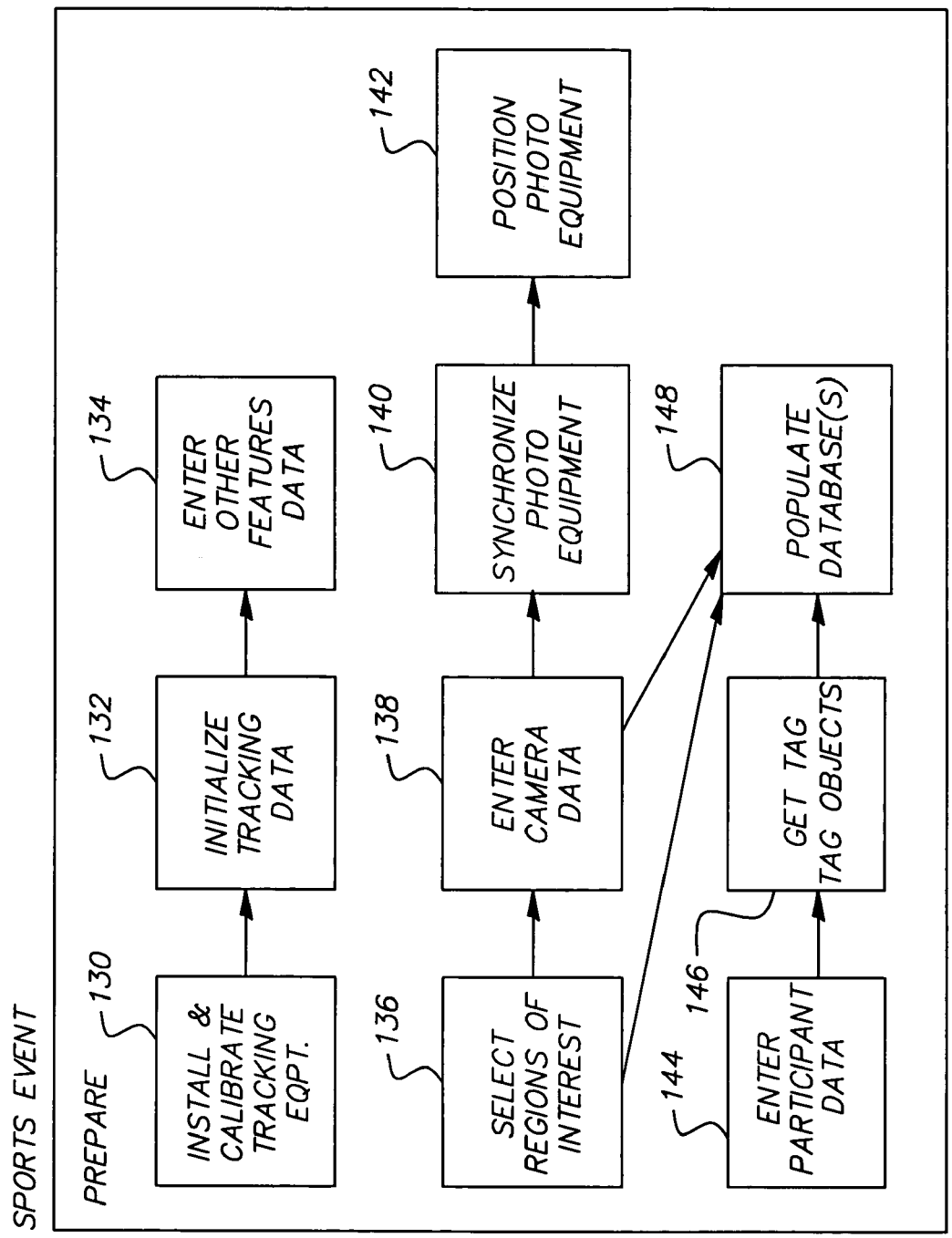
FIG. 12 is a block diagram showing further details of the preparation function shown in FIG. 11.

The preparation function 120 can occur anytime prior to the start of the game. As shown in FIG. 12, the game preparation starts with the installation and calibration of tracking equipment in a tracking preparation step 130 and the initialization of the tracking equipment in an initialization step 132. At the same or similar time, the high quality imaging system 82 is set up. First, a region(s) of interest is selected in a region selection step 136 and the high quality photo equipment is synchronized in a synchronization step 140. In a positioning step 142, the photo equipment is positioned so that the line of sight 44 generally aligns with the selected region of interest. Once the basic positioning and initialization of the equipment is completed, the preparation activity turns to the population of the various databases in the population step 148.

Prior to starting the game, information is entered in a participant data step 144 into the participant database 102, including such data as name, team, player number, player statistics, etc. Some information such as player statistics may reside in another database (such as a league statistics database) and could be linked to the participant database 102. A player ID may be assigned at this time or it may be entered when a tag 22 is assigned to a player. The participant database 102 may also include information on coaches, referees, photographers and other people for whom identification or location tracking is desired.

The image database 108 contains camera ID and other information pertaining to image capture. The constant camera data, such as camera ID, may be entered in a camera data step 138. Then, as each image is captured, information is stored in the image database 108 such as camera ID, frame or image ID, camera capture time, exposure data such as shutter and iris settings, other camera settings such as flash activation and lens focal length, field of view, text description, etc. The digital camera 20 typically has a clock, and the camera clocks may optionally be synchronized in the synchronization step 140 to a reference clock prior to the game. There may be a separate image database 108 for each game, or images from more than one game may be stored in a single database. In this later case, game or date information may also be stored.

The other features database 104 with other features important to the game may be created as a separate database with data obtained from an other features data step 134, or may be combined with other databases. This database may include information useful for identification and location of important items such as the goal posts, field perimeter location, team bench location, penalty area, etc. This database may include such information as a feature ID, description, position and orientation data, perimeter location, etc.

RFID tags 22 are assigned to players, coaches, referees, photographers and other people for whom identification or location tracking is desired. People with tags keep them on their person before, during and after the game to facilitate tracking and identification. Tags may also be assigned (attached) to objects such as a goal post, ball, puck, or a camera. Accordingly, appropriate tag information obtained from a TAG entry step 146 is entered into the tag database 100 to relate the tags to the people or objects they are attached to, including such information as tag ID, participant ID, camera ID, feature ID, etc.

While line of sight information may be obtained in a variety of ways, as already mentioned, in the instant example information about the line of sight 44 of a camera 20 is obtained using RFID tags on a 2-axis bar 58 attached to the camera (see FIG. 5C). The tracking system obtains location information from the tags and computes the camera orientation and line of sight from this information, which is stored in the tracking database 106 (or the camera position database 110). The camera field of view 46 is contained in the camera settings information stored with each image in the image database 108.

Image Capture Function

Figure 13:
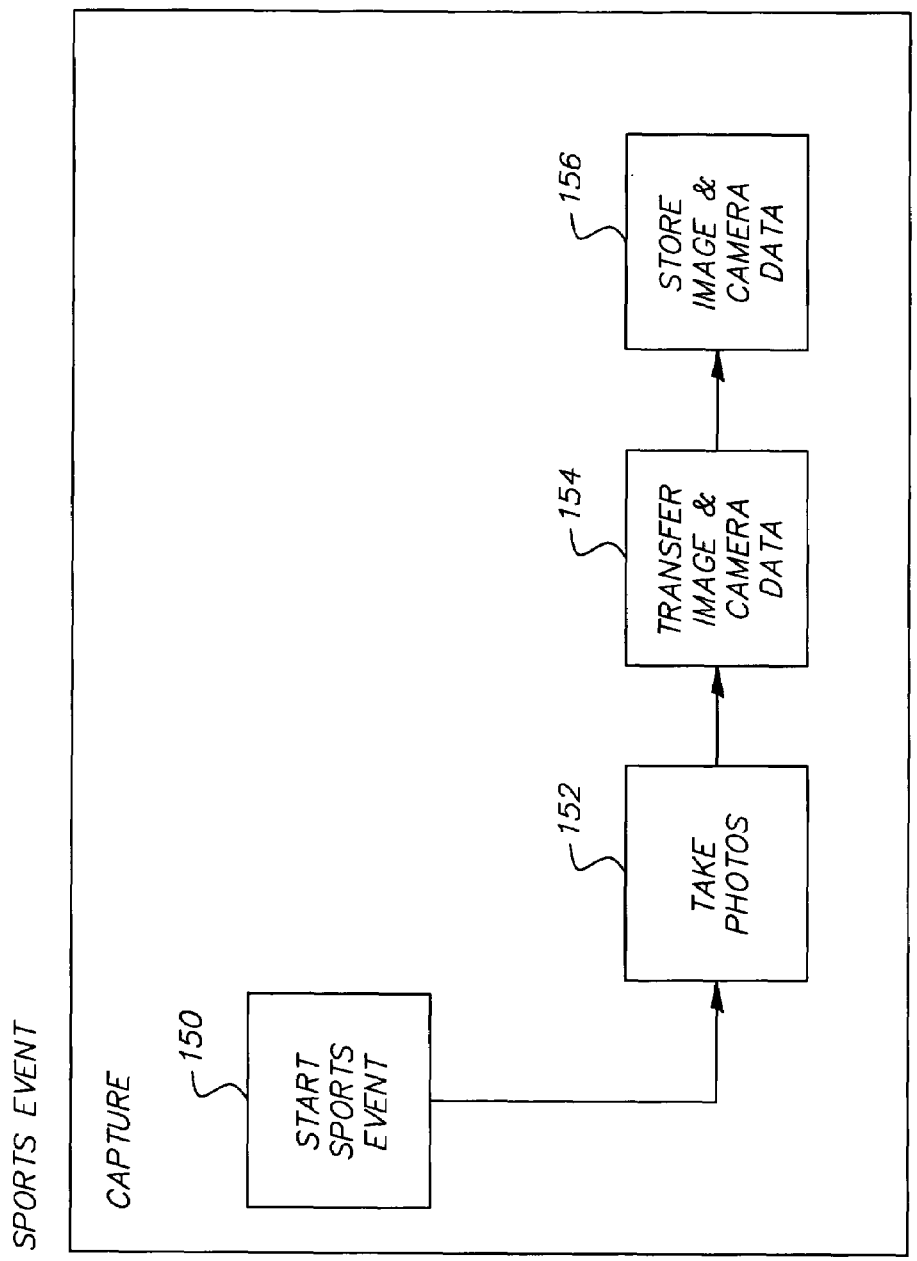
FIG. 13 is a block diagram showing further details of the capture function shown in FIG. 11.

Referring to FIG. 13, the capture function 122 begins prior to the start of the game (starting step 150), and continues until all images have been captured. Prior to the start of the game, participants obtain the tag 22 and any additional information about the participants may be entered into the appropriate databases. The tags 22 are attached to clothing, worn or otherwise retained during the sports event. Tags are also attached to objects of interest and corresponding information is entered into the appropriate databases.

Photographers may capture images (capture step 152) at any time after tags are attached to the camera 20 and the tracking system 80 is functional. Captured digital images may be stored in a temporary image database in the camera (e.g. removable memory), together with certain camera data—in particular including the capture time. Captured film images are stored on the film, which is subsequently scanned to provide digital images, and the camera data is stored on the film or on an ancillary storage device. The images and the camera data are transferred from the camera (or scanner) in a transfer step 154 and stored in a storage step 156. In one embodiment, the removable memory is periodically removed from the digital camera and placed in a remote computer where the images are transferred to a primary image database. Alternatively, in another embodiment, the digital camera may transmit the images by a cable connection to a remote computer for storage in the primary image database, or in yet another embodiment they may be transmitted by a wireless communication system to a remote computer for storage in the primary image database. The instant example will describe cameras with wireless connections to a remote computer.

Tracking Function

Figure 14:
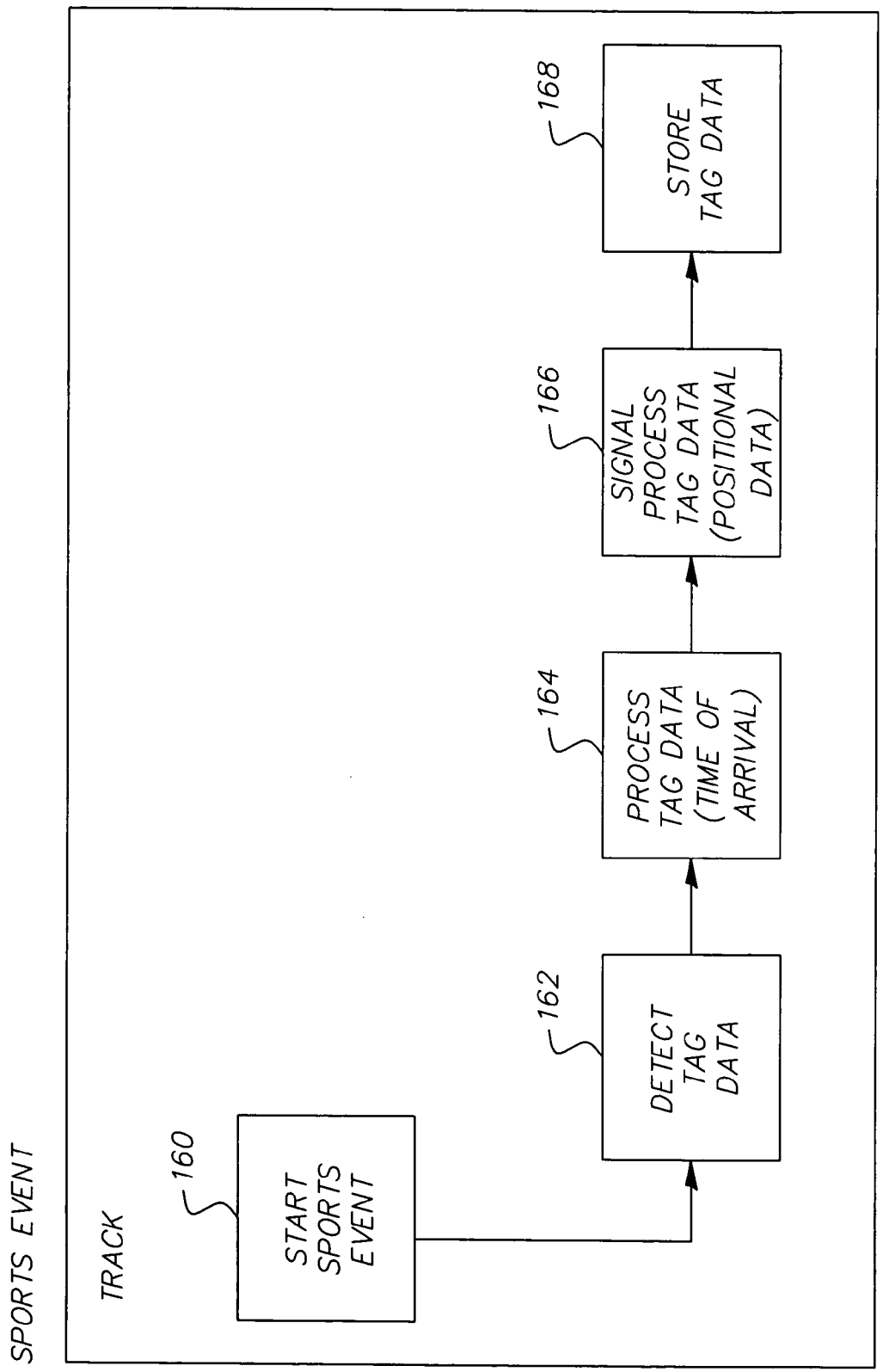
FIG. 14 is a block diagram showing further details of the tracking function shown in FIG. 11.

Referring to FIG. 14, after the sporting event starts (starting step 160), the tracking system shown in FIG. 2 detects TAG data on the playing field in a TAG data detection step 162 and processes the TAG data relative to its time of arrival in a processing step 164 to extract the time of arrival for the tagged event. The now-timed TAG data is next processed in a signal processing step 166 to obtain positional data of the tagged persons or objects for the given time. Finally, the processed data is stored with time and positional coordinates for later usage in a TAG data storage step 168.

The operation of a tracking system such as shown in FIG. 2 is well known to those skilled in the art. Generally, the tags 22 transmit unique identifying data (periodically or on command). The antenna 26 receives the tag data, which is processed and stored in the track database 106. The processed tag data may include track time, position and orientation data in any format such as XY, XYZ, XYZ-Roll-Pitch-Yaw, vector representation, etc. Additional information may also be stored, such as accelerometer data, etc. The track database 106 may also include one or more relative time values in addition to the track time. For instance the game time, the actual world time (e.g. Greenwich time), penalty time, or the time for each television camera used may also be stored in the track database 106.

A conventional tracking system, such as the one described in U.S. Pat. No. 6,204,813, features a radio frequency (RF) positioning system that determines the identity and positional data such as location, velocity, and acceleration of numerous objects. The system includes a plurality of spread spectrum radio transceivers where at least one transceiver is positioned on each object. Using spread spectrum radio transceivers is advantageous because it allows unlicensed operation.

At least three spread spectrum radio tower transceivers transmit to and receive signals from the plurality of radio transceivers on the objects. The three spread spectrum radio tower transceivers may employ directional antennas. Also, a processor is electrically coupled to each spread spectrum radio tower transceiver. The processor determines the time of arrival of signals received by each spread spectrum radio tower transceiver.

Each of the tower transceivers are coupled to a central signal processor by a network. The central signal processor determines the identity and positional data of the objects. The signal processor determines at least one of: position;

time derivatives of position; orientation; and time derivatives of orientation. The signal processor may be connected to the spread spectrum radio transceivers by any network, such as an Ethernet, fiber optic or wireless network.

The central signal processor includes a memory to store the identity and the positional data of the objects. A video processor may be used to display the identity and the positional data of the objects on a video display terminal. In addition, the central signal processor may include a database engine for storing and retrieving data relating to the objects. The data may include biographical data of players in a game such as physical characteristics (height, weight, and strength and speed metrics) and previous game statistics. The video processor can display the data relating to the objects separately or together with the identity and the positional data of the objects.

Such conventional systems also feature a method of determining identity and positional data of numerous objects in a three-dimensional space. The method is based on transmitting a spread spectrum signal that instructs a particular one of the plurality of spread spectrum radio transceivers on the objects to transmit a signal that can be processed to determine identity and positional data of the transceivers.

Signals are received from the spread spectrum radio transceivers on the objects with the spread spectrum radio tower transceivers. The signal processor coupled to the spread spectrum radio tower transceivers despreads the signals to determine the identity of the objects, and processes the signals to determine the positional data of the objects. The positional data may be at least one of: position; time derivatives of position; orientation; and time derivatives of orientation. The positional data of the objects may be determined from estimates of the times of arrival of the signals to each of the (at least) three tower antennas. The times of arrival may be measured relative to a synchronization clock.

The method further includes storing the identity and the positional data of the objects. The method may also include displaying the identity and positional data relating to the objects on a video screen. Information specific to the objects may also be displayed on the video screen. Further information regarding such a tracking system may be found in the aforementiond U.S. Pat. No. 6,204,813, which is incorporated herein by reference.

Correlation and Data Reduction Function

The next step is to determine who and what appears in each image. This is done through the correlation and data reduction function 126 using image data and track data.

Figure 15:
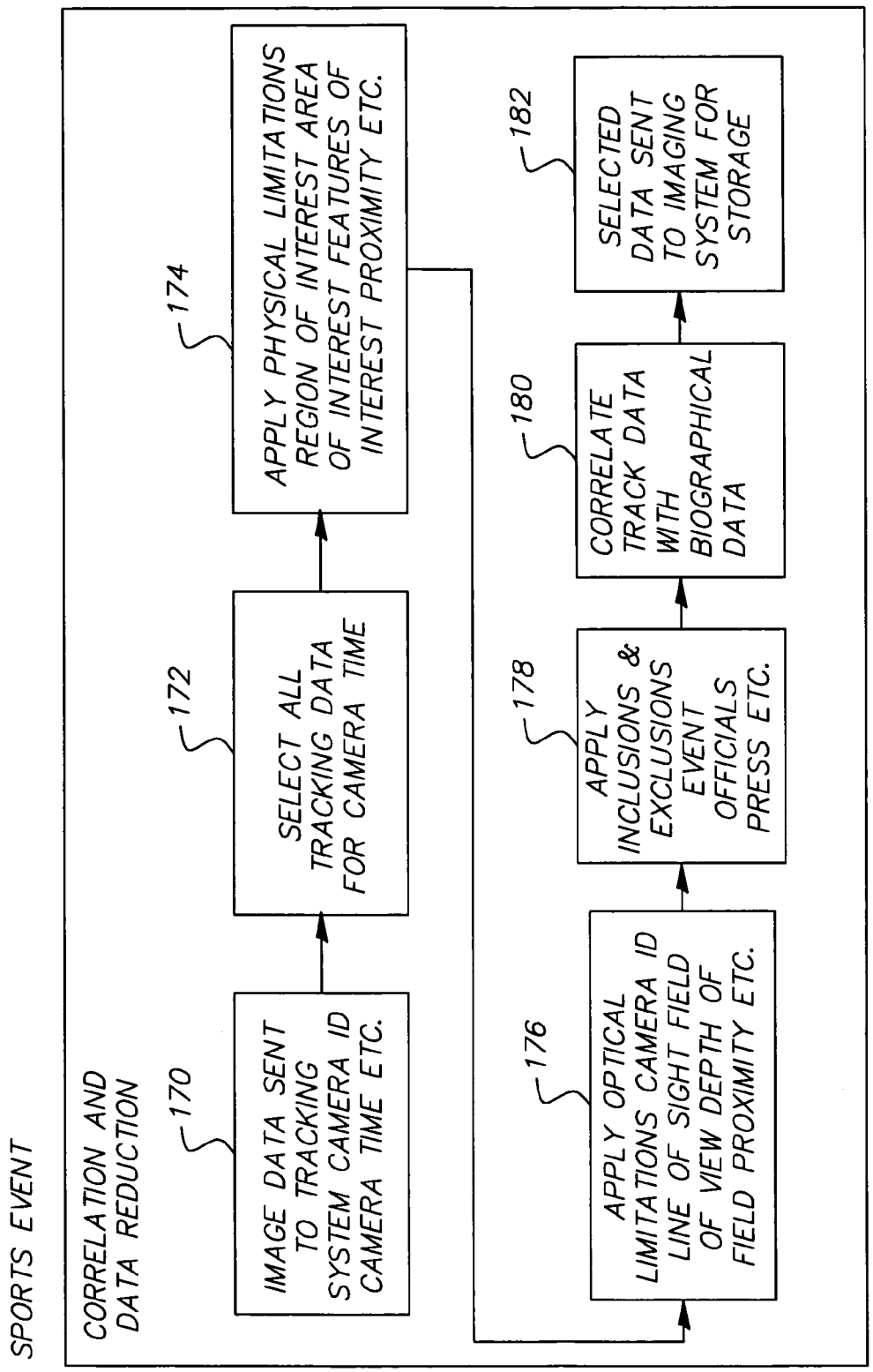
FIG. 15 is a block diagram showing further details of the correlation and data reduction function shown in FIG. 11.
Figure 16:
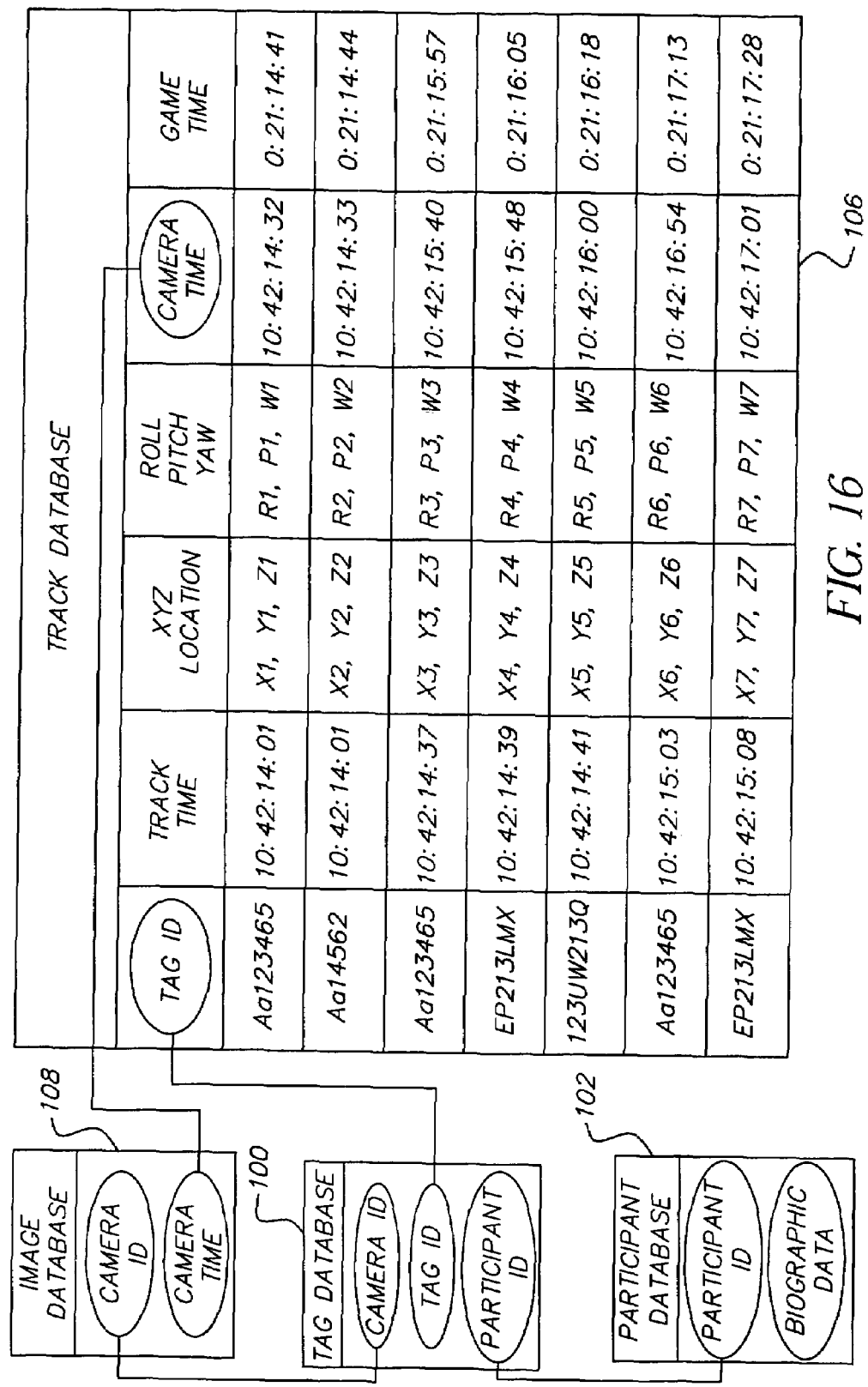
FIG. 16 shows an illustration of how camera time is used to relate the track time for given tag ID to images.

One implementation of the correlation and data reduction step is schematically shown in FIG. 15. In the instant example, the camera location and orientation is determined by the tracking system 80 using tags 22 associated with the camera 20. In a data upload step 170, image data such as camera ID, image 10, camera time and other information such as field of view and depth of field are sent to the tracking system 80 for a selected image. Next, in a selection step 172, all tracking data is isolated and selected that corresponds to the uploaded camera time. Such tracking data includes tag ID, tag capture time and position of the tag at the tag capture time. The tracking system 80 determines the position of all tags in the tracking database at the camera time. If tracking data is not available at exactly the camera time, the tracking system uses the available tracking data that has a track time that is in substantial correspondence with the time of capture of the images to determine the position of the tags at the requested camera time. "Substantial correspondence" should be understood to include tracking data with track times that are within a variable range of the requested camera time. Such a range can be defined by a "window" and the tracking data can be examined with a window processor to identify track times that are in "substantial correspondence" with the time of capture of the images.

The tracking system 80 may next apply all, some or none of the following data reduction operations to the tracking data.

Figure 10:
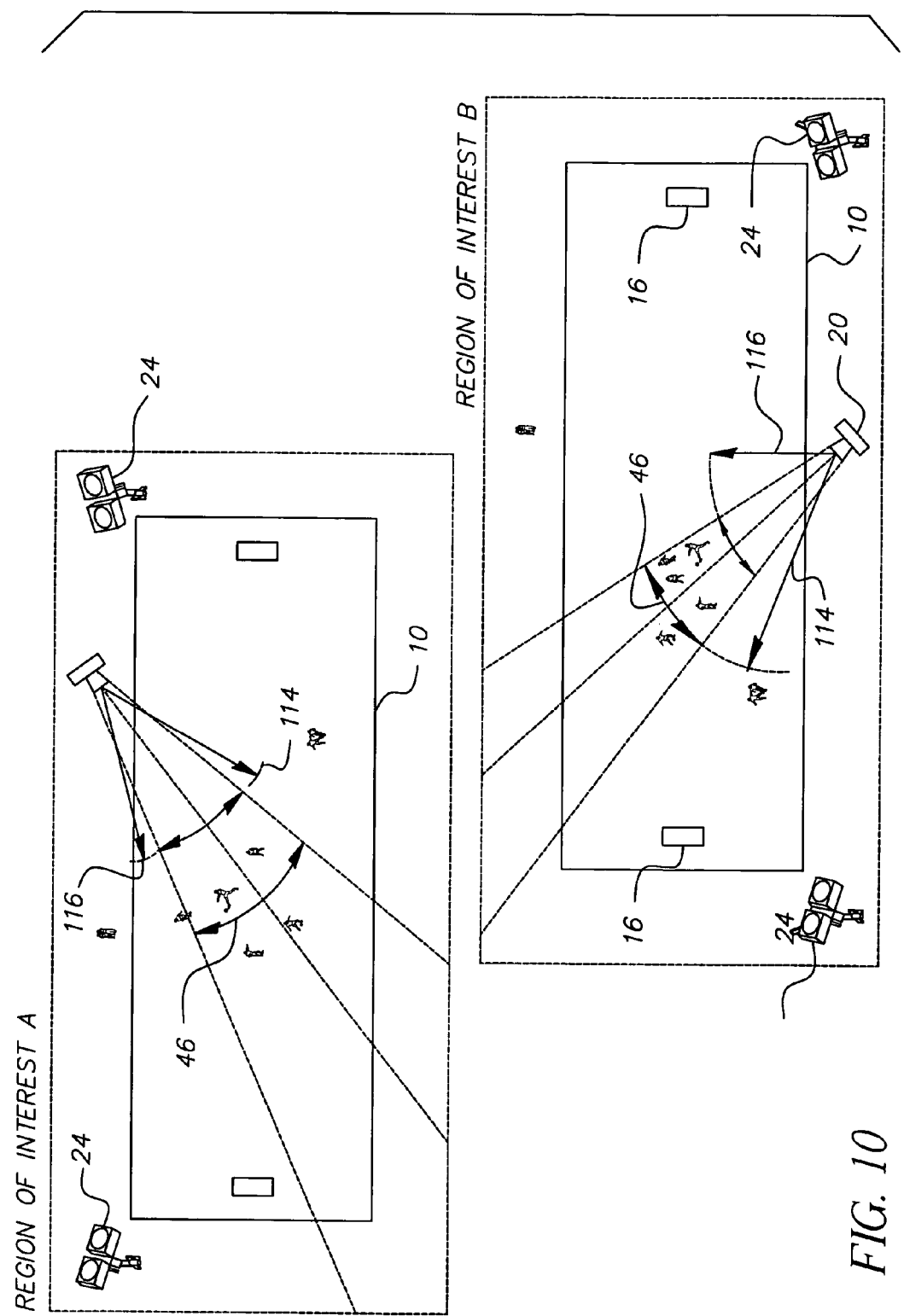
FIG. 10 is a pictorial illustration of two playing fields showing the use of depth of field to reduce the amount of tracking data.

In a physical limitations step 174, the tracking system 80 may apply a correlation and data reduction operation including known physical limitations to the tracking data. Physical limitations, typically defined as location data in the other features database 104, may include a region of interest (e.g., a high school sports facility), areas of interest (e.g., boundaries of soccer field #1, boundaries of soccer field #2, etc.), and features of interest (e.g., size and location of east goal, size and location of west goal, size and location of penalty box, etc.). A typical example of the two regions of interest (region of interest A and region of interest B) is shown in FIG. 10, wherein each region is a separate playing field. Information relating to these physical limitations may be entered at any time prior to the game. The physical limitations may be applied to the tracking data prior to receipt of the image data, or at the time of a specific search or query as shown in FIG. 15. Once the physical limitations are applied to the tracking data in the step 174, a physically limited subset of all track data is obtained. For example, a particular camera 20 might be limited to images taken at a specific soccer field, and the physically limited subset of track data for that camera would contain only track data for tags on the selected soccer field.

The tracking system 80 may next apply a correlation and data reduction operation including optical limitations to the track data in an optical limitations step 176. This operation may be performed by the tracking system or by the imaging system 82. In the instant example, the tracking system performs this operation. Using the camera ID sent to the tracking system 80, the tracking system locates tag data associated with the camera ID and calculates the camera location, orientation and line of sight. The camera location, line of sight (LOS) 44 and field of view (FOV) 46 information define the volume of space captured in the selected image (see FIG. 1). The tracking system uses this camera line of sight (LOS) 44 and field of view (FOV) 46 information in the optical limitations step 176 to select only the data from the physically limited track data subset that fall within the camera's field of view, producing a FOV limited track data set.

An additional optical limitation operation may include the application of depth of field (DoF) information that may also be sent to the tracking system to further reduce the track data set. DoF information may be defined in several ways, such as a lookup table relating lens aperture and focal length. In the instant example as shown in FIG. 10, the DoF is sent in the form of a maximum (114) and a minimum (116) tracking limit distance. The tracking system 80 applies this DoF information to the FOV limited track data subset to select only those tags 22 that are located within the FOV 46 between the minimum (116) and maximum (114) tracking limit distances from the camera 20. It is also possible to define these tracking limit distances from some other object than the camera, such as a goal or another tag (e.g., player). In yet another implementation, the focal distance of the camera for a given image may be used in conjunction with a proximity value, and the tracking system could compute all tags that fall within the FOV and are within the proximity value of the focal distance from the camera. Those skilled in the art can identify additional ways of defining an area within the field of view of the camera within which all tags are to be identified, and all such alternatives are included within the scope of this invention. The data at this point in the correlation and data reduction process is described as the DoF limited track data subset.

In an inclusion and exclusion step 178, the correlation and data reduction process may also modify the selected track data by applying inclusions and exclusions. For instance, it may be desirable to always identify or include certain tags that otherwise would not be included in DoF track data subset. For example, a particular player may be of interest regardless of their location within the field of view of a given image, or an operator may be searching for all images with a particular player in the image regardless of where the player is located. Exclusions may also be applied to the DoF track data. For instance, it may be desirable to eliminate all game officials or photographers from the data subset.

A selected track data subset is the result of performing all desired data reduction operations, where the selected track data subset includes at least the Tag ID, and optionally the position data, of all people and objects that are likely to be within the image after the data reduction operations.

The next operation in the correlation and data reduction process is correlating the selected track data subset with biographic data (correlation step 180) that is maintained in this example in the participant database 102. This operation can be performed by the tracking system 80 or by the imaging system 82. The result is that the image system obtains, as shown in FIG. 18, a listing of selected tags within a particular image, position and the biographic data associated with those selected tags, thereby providing identification of all selected people and objects within the image.

Figure 17:
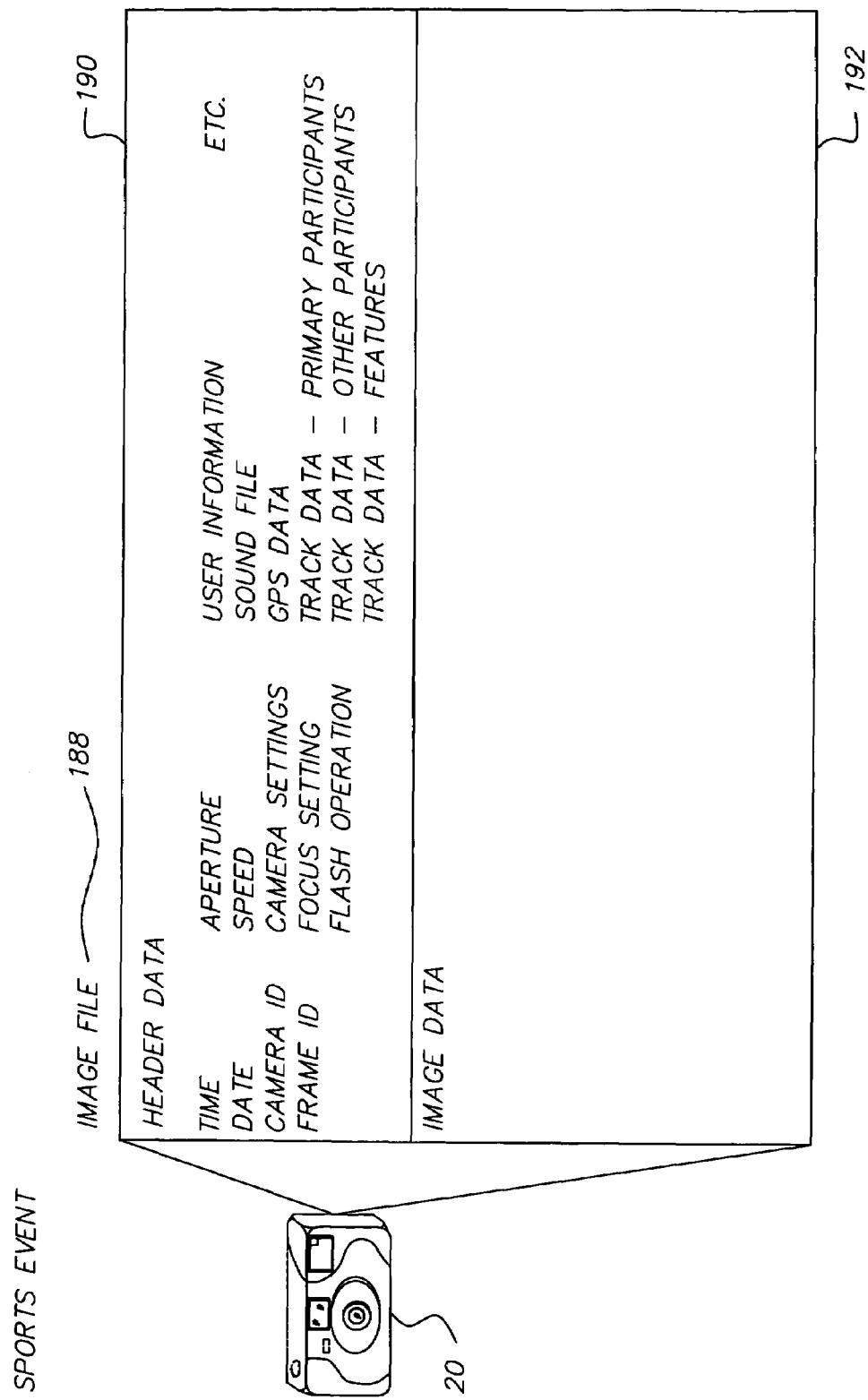
FIG. 17 is an illustration of an image file including a header data portion and an image data portion.

The image system 80 may optionally store the tag and biographic information in the image database 108. This may be done using any database management method known in the art. In addition, or alternatively, the tag and biographic information may be stored with the image itself. As shown in FIG. 17, this is typically done in the image header portion 190 of the image file 188. The stored information may include all or a portion of the tag, biographic and position information available. The stored information may be optionally categorized (e.g. people within DoF; people within FOV (but not within the DoF); objects within FOV; etc.). One example of some of the stored information that might be included in the databases is shown in FIG. 18 for a particular listing of Tag IDs.

In the instant example, information such as the tag ID, position, camera ID and image or frame number are stored and categorized in the participant database for each identified person or object in the image. In addition, tag, position and biographic information of each identified person or object identified within an image may be stored and categorized in the image header 190 of the image file 188.

Note that while these correlation and data reduction operations have been described in a particular order, it is possible for the sequence to be organized differently and still provide the desired result. Alternatively, some of these operations may not be performed for a given image. Portions of the correlation and data reduction process may be performed at different times, and/or they may be performed on different computers, as desired. For example, the physical limitations portion 174 may be performed prior to the arrival of any image data, or the physical limitations portion may be performed on the tracking system while the optical limitations 176 may be performed on the image system. (However, the optical limitation portion of the correlation process occurs at any time following image capture.) For example, referring to FIG. 21, if the camera 310 has removable memory 312*a*, the correlation process may occur in batches after the images are entered into the primary image database in the download computer 314. If images are transmitted from the camera 310 to the remote computer 314 via cable or wireless communication 312*b*, then the correlation process may occur immediately after the images are stored in the primary image database in the download computer 314. In the instant example, the correlation process occurs immediately after images are stored in the primary image database.

This correlation and data reduction process may be repeated for each image of interest. In alternative implementations, a batch of images may be processed as a group.

Preview and Print

In a first preview and print scenario using the instant invention, the correlation and data reduction process 126 is performed when images are entered into the image database. Thus all images have had the identity of participants and objects determined and stored with the images in the image database 108.

Figure 19:
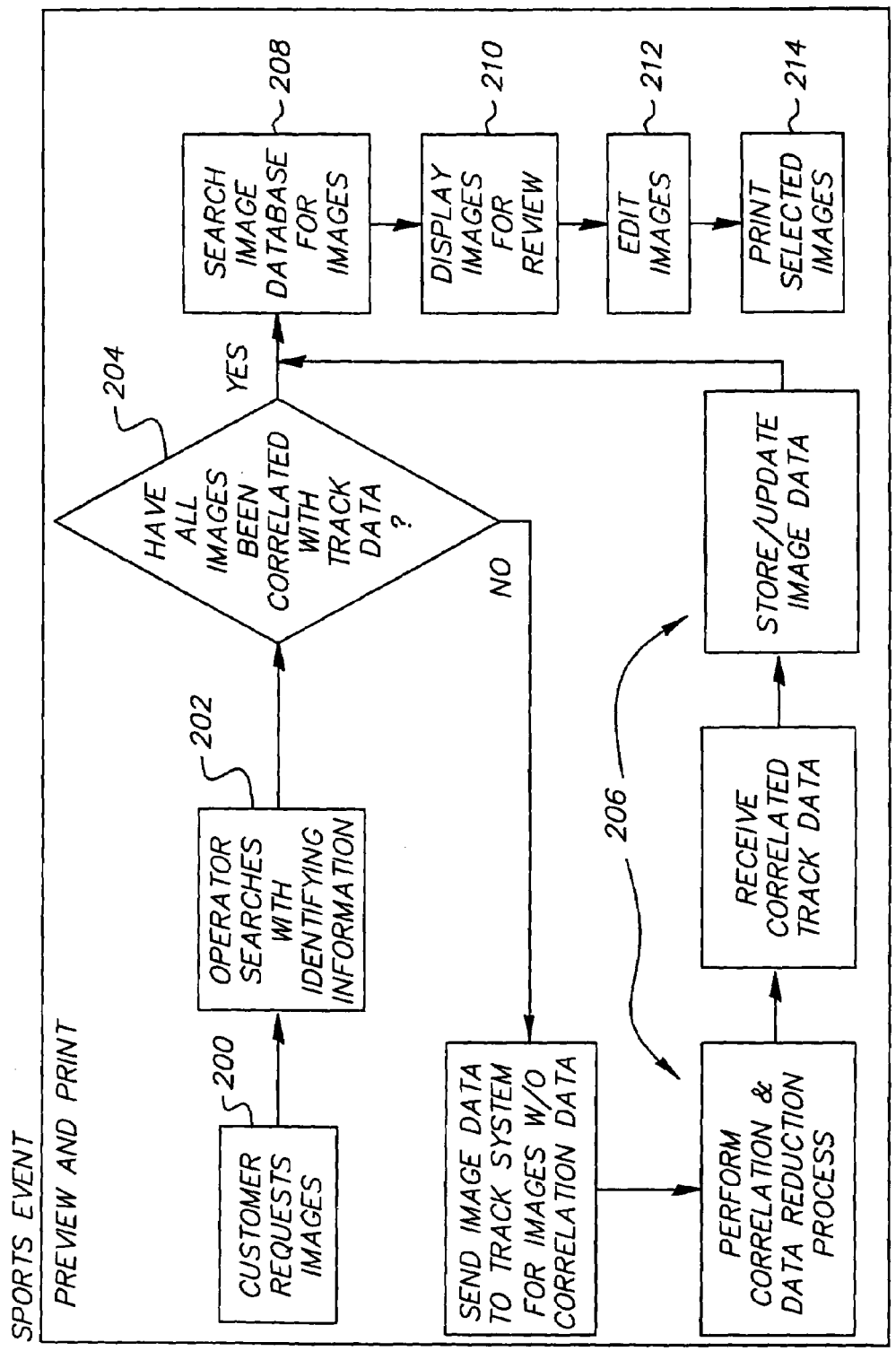
FIG. 19 is a block diagram showing further details of the preview and print function shown in FIG. 11.

Referring to FIG. 19, a customer (who may be a participant, spectator or other person) approaches an operator at a photo station, such as the image system 82 in FIG. 21, and asks to see all images taken of a participant during the game (request step 200). An operator may identify the participant with information from the customer (e.g., name) or by reading the tag ID from the participant's tag, if available (information search step 202). The operator enters the information into the imaging system and performs a search for images of the participant. The imaging system determines if the correlation and data reduction process has been run on all images (query step 204), and if not, that process is performed (correlation and data reduction step 206) on any images without participant identification information. The imaging system uses the identifying information and other information to locate all images (search step 208) of the participant in the image database (see FIG. 20). Alternatively, the participant database could be searched. The located images are displayed for customer review (review step 210). The customer may edit images (edit step 212) and select images for output as prints, on a CD, or any other output method known to the art (output step 214).

In a second preview and print scenario using the instant invention, the correlation and data reduction process 126 either has not yet been performed on all images, or the desired participant or object was not included in the final tracking data subset used to record identities in the image database.

As before, a customer approaches a photo station to see images of a participant (request step 200). As shown in FIG. 19, an operator uses information from the customer to perform a search for images of a particular participant (search step 202). First, the image system determines if the correlation and data reduction process has been performed on all images (query step 204). If true, the image system searches the image database for any images including the participant of interest (search step 208). Prior to display, the results of this search may be reduced according to appropriate criteria (e.g. participant distance from camera) and the results may be placed in a particular sequence for display based a preferred parameter (e.g., smallest distance from camera first). The customer or operator may choose to edit (edit step 212) any of the displayed images using techniques well known in the art. Images may then be selected for output (output step 214) in any desired method (e.g., prints, t-shirts, digital files on a CD, email, etc.).

If the image system 82 determines that some of the images have not had the correlation and data reduction process 126 performed on them, then the image system sends appropriate information to the tracking system 80 (e.g., camera ID, camera time, etc.). The operator may also send additional limitations to the tracking system, including features of interest (e.g. sports field or game identifier). The tracking system then performs the correlation and data reduction process on those images. The tracking system returns the required data to the image system for those images, and the image system stores or updates the image database with the new data. The image system then proceeds to search the database for the particular participant requested by the customer, the selected images are sorted and displayed, optionally edited and selected images ordered as before.

Second Implementation: Locating High Quality Images for Display on a Low Image Quality Tracking System In this implementation as shown in FIG. 7B, information from a tracking system 80 is used to locate high quality images provided by a high quality image system 82 for display on the low quality video displays associated with the tracking system 80.

Camera image data are stored in the image database 108 as described in the first implementation. Image data is correlated to data in the tracking database in a similar manner to that described in the first implementation. Images may be located and displayed or printed as described in the first implementation.

The significant benefits of this implementation is that it enables independent photographers to identify players and objects within every image they capture, and the video, TV or Internet viewers can also access high quality (still) images and order products as desired.

One implementation of the instant invention is for professional sports events such as a hockey game. Professional photographers can use the tracking information to identify players and puck locations in the photos they capture, and the sports news organizations can utilize the images in their broadcasts. Additionally, viewers can access and purchase images that interest them.

Another implementation of the instant invention is for non-professional sports events such as a little league soccer game. A portable tracking system is set up around a sports field, and photographs are captured during the game. Players and audience members can purchase photographic products with the images, for either immediate or remote fulfillment. Other implementations could include less structured competitions, such as cheerleader competitions, or performances and performance competitions, such as band performances or band festivals, where large numbers of individuals either perform in a defined three-dimensional space such as a stage or pass a defined staging location, such as a reviewing stand. Within an industrial or surveillance setting, the invention can be used to identify individuals within a three-dimensional controlled space, such as a factory floor or an entry foyer.

Figure 3:
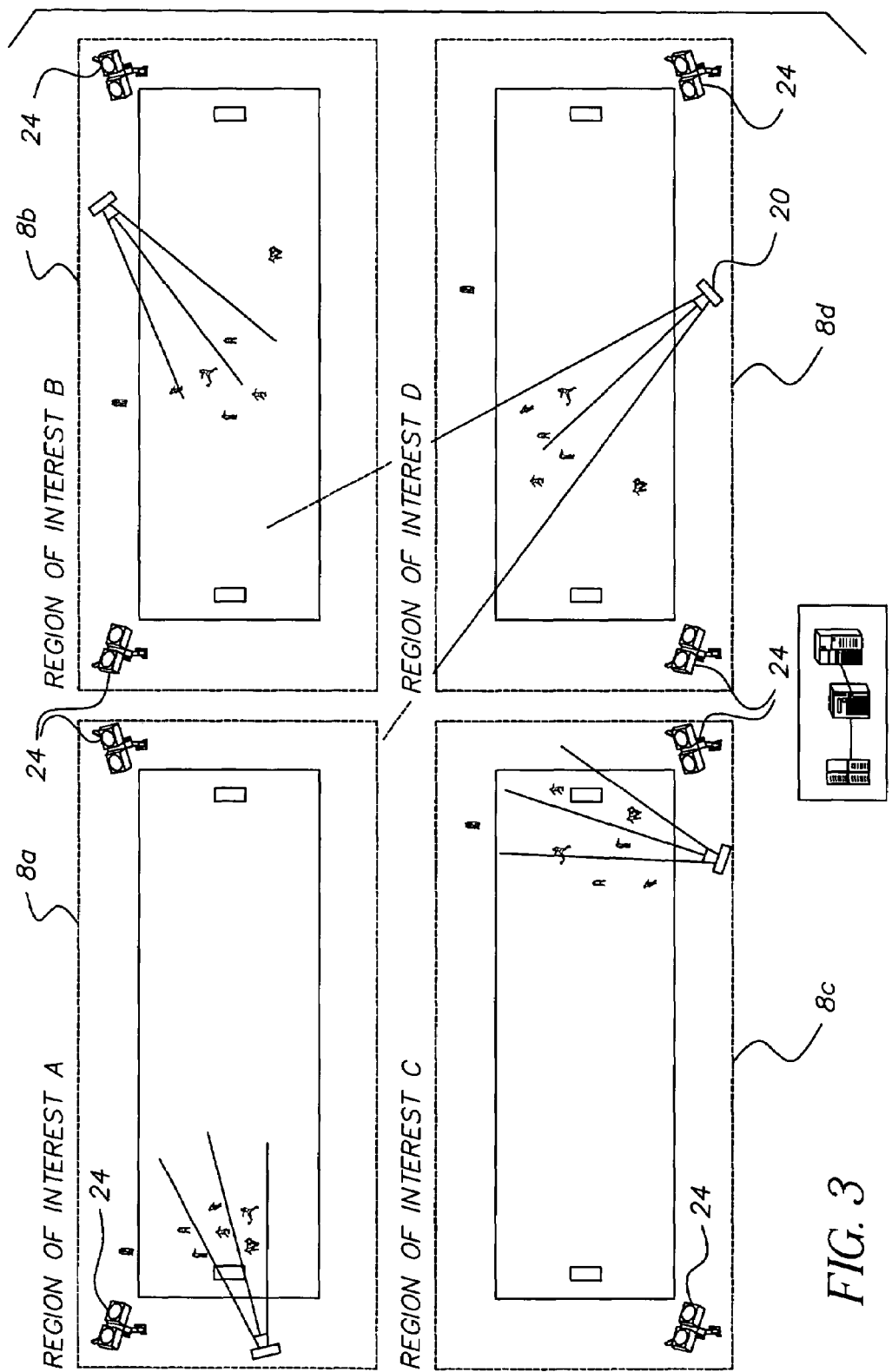
FIG. 3 is a pictorial illustration of a plurality of playing fields covered by one or more tracking systems.

Another implementation would provide a tracking system for more than one sports field (see FIG. 3). In this embodiment, multiple sports fields 8a, 8b, 8c, 8d may be covered by one or more tracking systems 21a,b . . . associated with the tracking stations 24. The tracking system can discriminate between separate fields or regions of coverage A, B, C and D by either having multiple tracking stations 24 for each field or by having a definition of regions of coverage within the tracking database 106. The tracking database 106 may also include region of coverage information within it. The correlation system would then eliminate players or objects within the field of view of a camera that was not also within the region of coverage of interest.

In another implementation of the instant invention, attendees of a large convention (e.g. a political convention) or other gathering of people could all be provided with tags. A tracking system could be established around the convention site. For instance, assuming that the regions of interest A . . . D in FIG. 3 represent different areas of a convention floor, the field of view of the camera 20 covering the region of interest D also extends over to the region of interest B. By using the aforementioned inclusions, exclusions and limitations, people or objects within the region of interest B may be eliminated from the field of view of the camera used for the region of interest D. Photographs captured during the convention would automatically be correlated to the tracking data to identify all those within a given image.

The invention has been described with reference to a preferred embodiment. However, it will be appreciated that variations and modifications can be effected by a person of ordinary skill in the art without departing from the scope of the invention.

Parts List

| | |
|---|---|
| 8 | playing field |
| 8a . . . d | playing fields |
| 10 | boundary |
| 12 | active players |
| 14 | non active players, coaches, onlookers |
| 16 | goal post |
| 18 | team bench or penalty box |
| 20 | camera |
| 21 | tracking system |
| 22 | tag |
| 22a | first tag |
| 22b | second tag |
| 22c | third tag |
| 23 | angle |
| 24 | tracking station |
| 26 | receiving antenna |
| 28 | transmitting antenna |
| 30 | electronics portion |
| 32 | remote computer |
| 34 | external database |
| 36 | gateway |
| 38 | server |
| 40 | wireless transmission |
| 42 | photographers |
| 44 | line of sight |
| 46 | field of view |
| 50 | tracking data acquisition unit |
| 52 | data link |
| 54 | wireless transmitter |
| 56 | fixture |
| 58 | 2-axis fixture |
| 60 | camera tracking information |
| 62 | storage step |
| 64 | storage step |
| 66 | storage step |
| 70 | mechanized gimbal |
| 72 | tripod |
| 80 | tracking system |
| 82 | high quality system |
| 84 | arrow |
| 100 | tag database |

-continued

| | |
|---|---|
| 102 | participant database |
| 104 | other features database |
| 106 | tracking database |
| 108 | image database |
| 110 | camera position database |
| 114 | maximum tracking limit distance |
| 116 | minimum tracking limit distance |
| 120 | preparation function |
| 122 | capture function |
| 124 | tracking function |
| 126 | correlation and data reduction function |
| 128 | preview and print function |
| 130 | tracking preparation step |
| 132 | initialization step |
| 134 | other features data step |
| 136 | region selection step |
| 138 | camera data step |
| 140 | synchronization step |
| 142 | positioning step |
| 144 | participant data step |
| 146 | TAG entry step |
| 148 | population step |
| 150 | starting step |
| 152 | capture step |
| 154 | transfer step |
| 156 | storage step |
| 160 | starting step |
| 162 | TAG detection step |
| 164 | processing step |
| 166 | signal processing step |
| 168 | TAG data storage step |
| 170 | data upload step |
| 172 | selection step |
| 174 | physical limitation step |
| 176 | optical limitation step |
| 178 | inclusions and exclusions step |
| 180 | correlation step |
| 188 | image file |
| 190 | header data |
| 192 | image data |
| 200 | request step |
| 202 | information search step |
| 204 | query step |
| 206 | correlation and data reduction step |
| 208 | search step |
| 210 | review step |
| 212 | edit step |
| 214 | output step |
| 310 | camera |
| 312a | removable storage media |
| 312b | tethered link |
| 314 | download computer |
| 316 | point of consumer computer |
| 318 | print server |
| 320 | printer |
| 322 | poster printer |
| 324 | network switch |

What is claimed is:

1. A method for correlating tracking data, associated with an activity occurring in a three-dimensional space, with images captured within the space, wherein remotely-accessible identification tags attached to people and/or objects associated with the activity are linked to one or more databases that uniquely identify characteristics of the people and/or objects, said method comprising the steps of:
(a) locating a camera with respect to the three-dimensional space, wherein the camera at a given location has a determinable orientation and field of view that encompasses at least a portion of the space;
(b) capturing a plurality of images with the camera and storing data corresponding to the images, including a capture time for each image;
(c) capturing tracking data from the identification tags attached to the people and/or objects within the space and storing the tracking data, including a tag capture time for each time that a tag is remotely accessed;
(d) correlating each image and the tracking data by interrelating tracking data having a tag capture time in substantial correspondence with the capture time of each image, thereby generating track data corresponding to each image;
(e) utilizing the track data to determine positions of the people and/or objects within the three dimensional space at the capture time of each image; and
(f) utilizing the location and orientation of the camera to determine the portion of the space captured in each image and thereby reduce the track data to a track data subset corresponding to people and/or objects positioned within the portion of space captured in each image.

2. The method as claimed in claim 1 further comprising the steps of:
(g) selecting an image from the plurality of images; and
(h) utilizing the track data subset to identify characteristics of the people and/or objects positioned within the portion of space captured in the selected image.

3. The method as claimed in claim 1 further comprising the steps of:
(g) selecting a participant and/or object ID associated with a particular identification tag attached to a particular person and/or object; and
(h) utilizing the track data subset corresponding to people and/or objects within each image to identify one or more images in which the person and/or object appears.

4. The method as claimed in claim 1 wherein remotely-accessible identification tags are placed on the camera or on apparatus supporting the camera and the tracking data captured in step (c) includes tracking data from the tags on the camera or on apparatus supporting the camera and the location and orientation of the camera is determined from the tracking data.

5. The method as claimed in claim 1 wherein the camera has a field of view that is oriented along a predetermined line of sight, and wherein the orientation is determined from the line of sight.

6. The method as claimed in claim 1 wherein the three-dimensional space includes activities occurring in a plurality of physically-limited locations within the space and information regarding these physically-limited locations is included in the tracking data captured in step (c) and utilized in step (g) to further reduce the track data to a track data subset corresponding to people and/or objects positioned within a physically-limited location within the portion of space captured in each image.

7. The method as claimed in claim 6 wherein the activity is a game or like gathering that is played on a playing field in a sports facility, and the physically-limited location is at least one of a particular sports facility, a particular playing field as defined by its boundaries, or a particular defined area within a particular playing field.

8. The method as claimed in claim 1 wherein an optical limitation is utilized in step (g) to further reduce the track data to a track data subset corresponding to people and/or objects positioned within an optically-limited volume within the portion of space captured in each image.

9. The method as claimed in claim 8 wherein the optical limitation is a depth of field limitation of the camera, wherein the track data subset corresponds to people and/or objects positioned within both the portion of space captured in each image and the optically-limited volume defined by the depth of field limitation.

10. The method as claimed in claim 1 wherein one or more inclusions are utilized in step (g) to further reduce the track data to a track data subset corresponding to an included subset of people and/or objects positioned within the portion of space captured in each image.

11. The method as claimed in claim 9 wherein one or more inclusions are utilized in step (g) to include track data in the track data subset corresponding to certain included people and/or objects positioned within the portion of space captured in each image but that are nonetheless outside the depth of field limitation.

12. The method as claimed in claim 1 wherein one or more exclusions are utilized in step (g) to further reduce the track data to a track data subset that excludes certain people and/or objects that are nonetheless positioned within the portion of space captured in each image.

13. The method as claimed in claim 1 wherein the activity is a game or like kind of competitive gathering played out on a three-dimensional space comprising a bounded field and the tracking data includes identifiers for one or more participants appearing in an image and wherein step (g) further comprises correlating the images and the tracking data to identify one or more of the participants appearing in the images.

14. The method as claimed in claim 13 further comprising the step (h) of utilizing the track data subset to link to one or more databases containing biographical details of the participants positioned within the portion of space captured in each image.

15. The method as claimed in claim 1 wherein the camera is a digital camera.

16. The method as claimed in claim 1 wherein the camera is a film camera.

17. A system for correlating tracking data, associated with an activity occurring in a three-dimensional space, with images captured within the space, wherein remotely-accessible identification tags attached to people and/or objects associated with the activity are linked to one or more databases that uniquely identify characteristics of the people and/or objects, said system comprising:

an imaging system including one or more cameras located at given locations with respect to the three-dimensional space, wherein each camera has a determinable orientation and field of view that encompasses at least a portion of the space, thereby enabling the imaging system to capture a plurality of images of the portion of the space and store data corresponding to the images, including a capture time for each image;

a tracking system for capturing tracking data from the identification tags attached to the people and/or objects within the space and storing the tracking data, including a tag capture time for each time that a tag is remotely accessed; and a correlation and data reduction stage for (1) correlating the selected image and the tracking data by interrelating tracking data having a tag capture time in substantial correspondence with the capture time of the selected image, thereby generating track data corresponding to the selected image; (2) utilizing the track data to determine positions of the people and/or objects within the three dimensional space at the capture time of the selected image; and (3) utilizing the location and orientation of the camera to determine the portion of the space captured in the selected image and thereby reduce the track data to a track data subset corresponding to people and/or objects positioned within the portion of space captured in the selected image.

18. The system as claimed in claim 17 further comprising an output stage for utilizing the track data subset to identify characteristics of the people and/or objects positioned within the portion of space captured in the selected image.

19. The system as claimed in claim 17 wherein remotely-accessible identification tags are placed on the camera or on apparatus supporting the camera and the tracking system processes tracking data from the tags on the camera or on apparatus supporting the camera in order to determine the location and orientation of the camera.

20. The system as claimed in claim 17 wherein the remotely accessible identification tags are radio frequency identification tags.

21. The system as claimed in claim 17 wherein the activity is a game or like kind of competitive gathering played out on a three-dimensional space comprising a bounded field and the tracking data includes identifiers for one or more participants appearing in an image, and wherein the correlation and data reduction stage further correlates the images and the tracking data to identify one or more of the participants appearing in the images.

22. The system as claimed in claim 21 further comprising one or more databases containing biographical details of the participants, wherein data identifying one or more of the participants appearing in the images is used to link to the databases to retrieve biographical details concerning the participants.

23. The system as claimed in claim 17 wherein the camera is a digital camera.

24. The system as claimed in claim 17 wherein the camera is a film camera.

* * * * *